(12) United States Patent
Kamdar et al.

(10) Patent No.: US 8,913,509 B2
(45) Date of Patent: Dec. 16, 2014

(54) QUALITY OF SERVICE MANAGEMENT IN A FIXED WIRELESS CUSTOMER PREMISES NETWORK

(75) Inventors: Kamlesh S. Kamdar, Dublin, CA (US); Sergio Aguirre, Southlake, TX (US); Raafat Edward Kamel, Little Falls, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

(21) Appl. No.: 12/911,493

(22) Filed: Oct. 25, 2010

(65) Prior Publication Data

US 2012/0099428 A1 Apr. 26, 2012

(51) Int. Cl.
H04L 12/26 (2006.01)
H04W 28/16 (2009.01)
H04W 28/24 (2009.01)
H04L 12/24 (2006.01)

(52) U.S. Cl.
CPC .............. *H04W 28/16* (2013.01); *H04W 28/24* (2013.01); *H04L 41/5022* (2013.01)
USPC .......................................... 370/252

(58) Field of Classification Search
CPC ................................................ H04W 28/24
USPC ........... 370/235, 252, 329, 310, 331; 713/166
See application file for complete search history.

(56) References Cited

U.S. PATENT DOCUMENTS

| | | | |
|---|---|---|---|
| 7,006,472 B1 * | 2/2006 | Immonen et al. ............. | 370/332 |
| 7,817,611 B2 * | 10/2010 | Ogura ........................... | 370/338 |
| 7,899,864 B2 * | 3/2011 | Margulis ....................... | 709/204 |
| 8,200,796 B1 * | 6/2012 | Margulis ....................... | 709/223 |
| 8,203,953 B2 * | 6/2012 | Stophenson et al. .......... | 370/232 |
| 8,498,651 B2 * | 7/2013 | Livanos ...................... | 455/452.2 |
| 8,521,889 B2 * | 8/2013 | Anschutz et al. ............. | 709/228 |
| 2005/0021718 A1 * | 1/2005 | Sinclair ......................... | 709/223 |
| 2005/0141480 A1 * | 6/2005 | Jin et al. ....................... | 370/351 |
| 2005/0179607 A1 | 8/2005 | Gorsuch et al. | |
| 2007/0064673 A1 * | 3/2007 | Bhandaru et al. ............. | 370/351 |
| 2007/0173303 A1 | 7/2007 | Viorel et al. | |
| 2008/0049695 A1 * | 2/2008 | Ogura ........................... | 370/338 |
| 2008/0123660 A1 * | 5/2008 | Sammour et al. ......... | 370/395.21 |
| 2008/0267153 A1 * | 10/2008 | Mukherjee et al. ........... | 370/338 |
| 2009/0060531 A1 * | 3/2009 | Biegert et al. ................. | 398/214 |
| 2010/0208614 A1 * | 8/2010 | Harmatos ..................... | 370/253 |
| 2010/0311321 A1 | 12/2010 | Norin | |
| 2010/0313232 A1 | 12/2010 | Norin | |
| 2012/0263041 A1 * | 10/2012 | Giaretta et al. ............... | 370/236 |

OTHER PUBLICATIONS

Hannes Ekstrom, QoS Control in the 3GPP Evolved Packet System, Feb. 2009, IEEE Communications Magazine, LTE-3GPP Release 8.*
Mehdi Alasti et. al., Quality of Service in WiMAX and LTE Networks, May 2010, IEEE Communications Magazine, Topics in Wireless Communications.*

* cited by examiner

*Primary Examiner* — Gregory Sefcheck

(57) ABSTRACT

A method, performed by a fixed wireless router device, may include receiving a packet from a Long Term Evolution network, where the packet is associated with a particular Long Term Evolution Quality of Service class and mapping the particular Long Term Evolution Quality of Service class to a particular Differentiated Services Core Point Quality of Service class. The method may further include assigning a Differentiated Services Core Point Quality of Service class to the packet based on the particular Differentiated Services Core Point Quality of Service class and forwarding the packet to particular device associated with a customer premises network serviced by the fixed wireless router device, based on a priority associated with the assigned Differentiated Services Core Point Quality of Service class.

15 Claims, 13 Drawing Sheets

540

| 610 | 620 | 630 |
|---|---|---|
| VOICE 611 | LTE QCI 1 621 | DSCP QOS CLASS 1 631 |
| VIDEO TELEPHONY 612 | LTE QCI 2 622 | DSCP QOS CLASS 2 632 |
| VIDEO STREAMING 613 | LTE QCI 3 623 | DSCP QOS CLASS 3 633 |
| REAL-TIME GAMING 614 | LTE QCI 4 624 | DSCP QOS CLASS 4 634 |
| APPLICATION SIGNALING 615 | LTE QCI 5 625 | DSCP QOS CLASS 5 635 |
| THIRD PARTY HOSTED APPLICATIONS 1 616 | LTE QCI 6 626 | DSCP QOS CLASS 6 636 |
| THIRD PARTY HOSTED APPLICATIONS 2 617 | LTE QCI 7 627 | DSCP QOS CLASS 7 637 |
| PREMIUM ACCESS INTERNET TRAFFIC 618 | LTE QCI 8 628 | DSCP QOS CLASS 8 638 |
| BEST EFFORT INTERNET TRAFFIC 619 | LTE QCI 9 629 | DSCP QOS CLASS 9 639 |

FIG. 6

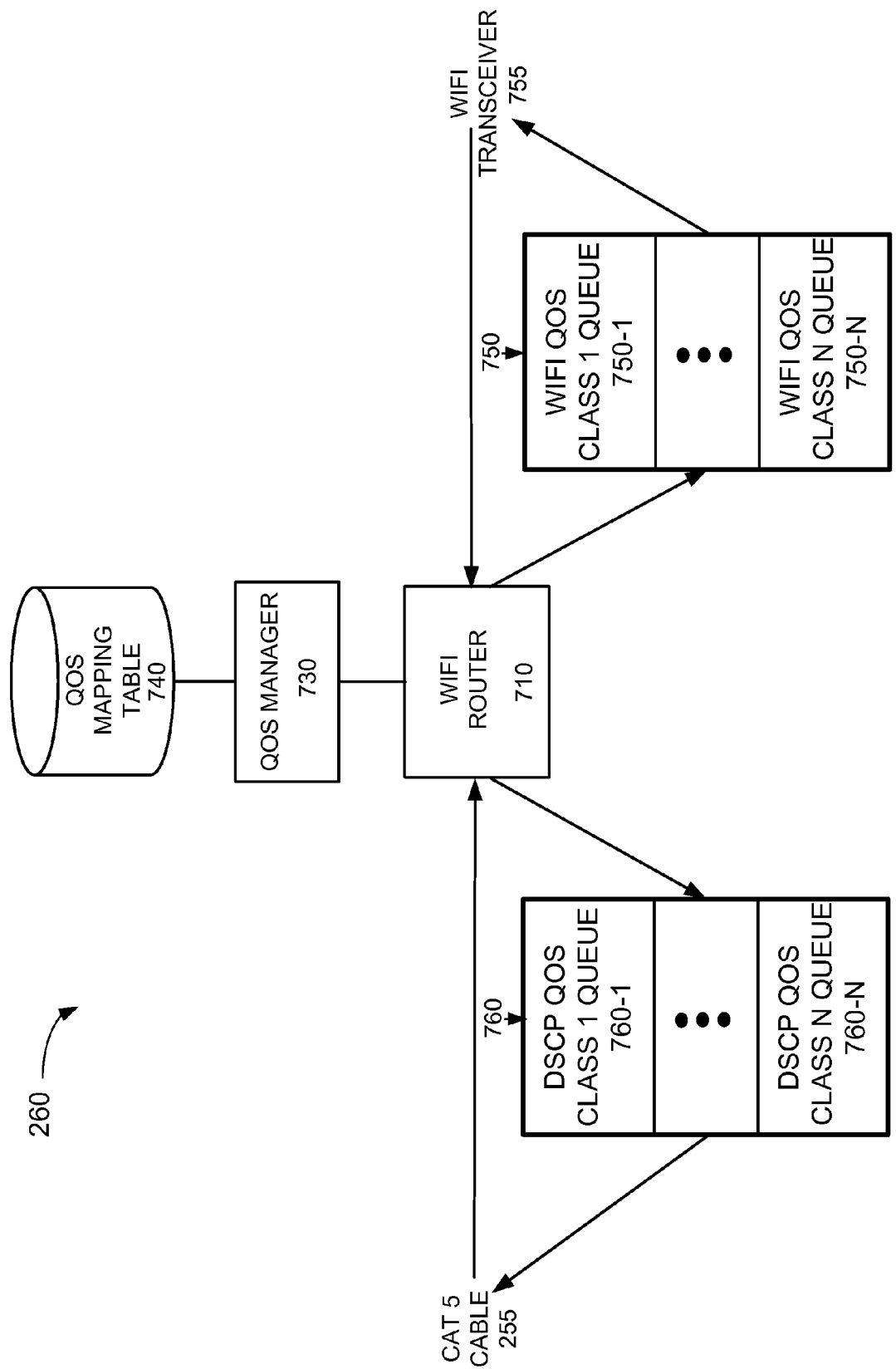

740 →

| 810 | 820 | 830 |
|---|---|---|
| VOICE 811 | WIFI QOS CLASS 1 821 | DSCP QOS CLASS 1 831 |
| VIDEO TELEPHONY 812 | WIFI QOS CLASS 2 822 | DSCP QOS CLASS 2 832 |
| VIDEO STREAMING 813 | WIFI QOS CLASS 3 823 | DSCP QOS CLASS 3 833 |
| REAL-TIME GAMING 814 | WIFI QOS CLASS 4 824 | DSCP QOS CLASS 4 834 |
| APPLICATION SIGNALING 815 | WIFI QOS CLASS 5 825 | DSCP QOS CLASS 5 835 |
| THIRD PARTY HOSTED APPLICATIONS 1 816 | WIFI QOS CLASS 6 826 | DSCP QOS CLASS 6 836 |
| THIRD PARTY HOSTED APPLICATIONS 2 817 | WIFI QOS CLASS 7 827 | DSCP QOS CLASS 7 837 |
| PREMIUM ACCESS INTERNET TRAFFIC 818 | WIFI QOS CLASS 8 828 | DSCP QOS CLASS 8 838 |
| BEST EFFORT INTERNET TRAFFIC 819 | WIFI QOS CLASS 9 829 | DSCP QOS CLASS 9 839 |

FIG. 8

QUALITY OF SERVICE MANAGEMENT IN A FIXED WIRELESS CUSTOMER PREMISES NETWORK

BACKGROUND INFORMATION

Bundled media services (e.g., combination packages of television, telephone, and/or broadband Internet services) have been successfully offered to households with wired connections to service provider networks. Households in areas without such wired connections (e.g., customer in regions that cannot be reached via conventional communication media, such as optical cables, copper cables, and/or other fixed wire-based technologies) may rely on fixed wireless services for some of these services (e.g., broadband access). However, previous generations of fixed wireless services have generally been unsuccessful. Expensive network equipment and customer premises equipment (CPE), high CPE installation costs, use of proprietary technology, and low data rates are among some of the reasons these fixed wireless services remained unpopular.

As wireless network data rates improve using fourth generation (4G) technologies, such as Long-Term Evolution (LTE), such technologies have become more attractive for fixed wireless networks. However, management of quality of service (QoS) in a fixed wireless customer premises network has remained a barrier to successfully promoting bundled services over fixed wireless networks.

BRIEF DESCRIPTION OF THE DRAWINGS

FIG. 6 is a diagram of example fields that may be stored within the Quality of Service mapping table depicted in FIG. 5 according to an implementation described herein;

FIG. 7 is a diagram illustrating an example of functional components of the WiFi access point depicted in FIG. 2 according to an implementation described herein;

FIG. 8 is a diagram of example fields that may be stored within the QoS mapping table depicted in FIG. 7 according to an implementation described herein;

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to configuring a broadband home router (BHR), which interfaces a fixed wireless customer premises network with an LTE network, based on a subscriber profile downloaded over the LTE network. The BHR may be configured for a particular data limit associated with a subscription and may be configured for a QoS mapping that relates a particular LTE QoS class, associated with the LTE network, to a particular differentiated services core point (DSCP) QoS class, associated with the customer premises network. Furthermore, a WiFi access point may be configured for a QoS mapping that relates a particular DSCP QoS class, associated with the customer premises network, to a particular WiFi QoS class, associated with devices that communicate wirelessly with the WiFi access point.

An implementation described herein may further relate to receiving a packet via an LTE network at the BHR, determining an LTE QoS class associated with the packet, and mapping the LTE QoS class to a DSCP QoS class; and/or to receiving a packet via a customer premises network at the BHR, determining a DSCP QoS class, and mapping the DSCP QoS class to an LTE QoS class. Furthermore, an implementation described herein may further relate to receiving a packet via a customer premises network at the WiFi access point, determining a DSCP QoS class associated with the packet, and mapping the DSCP QoS class to a WiFi QoS class; and/or to receiving a packet at the WiFi access point from a device communicating wirelessly with the WiFi access point, determining a WiFi QoS class, and mapping the WiFi QoS class to a DSCP QoS class.

Figure 1:
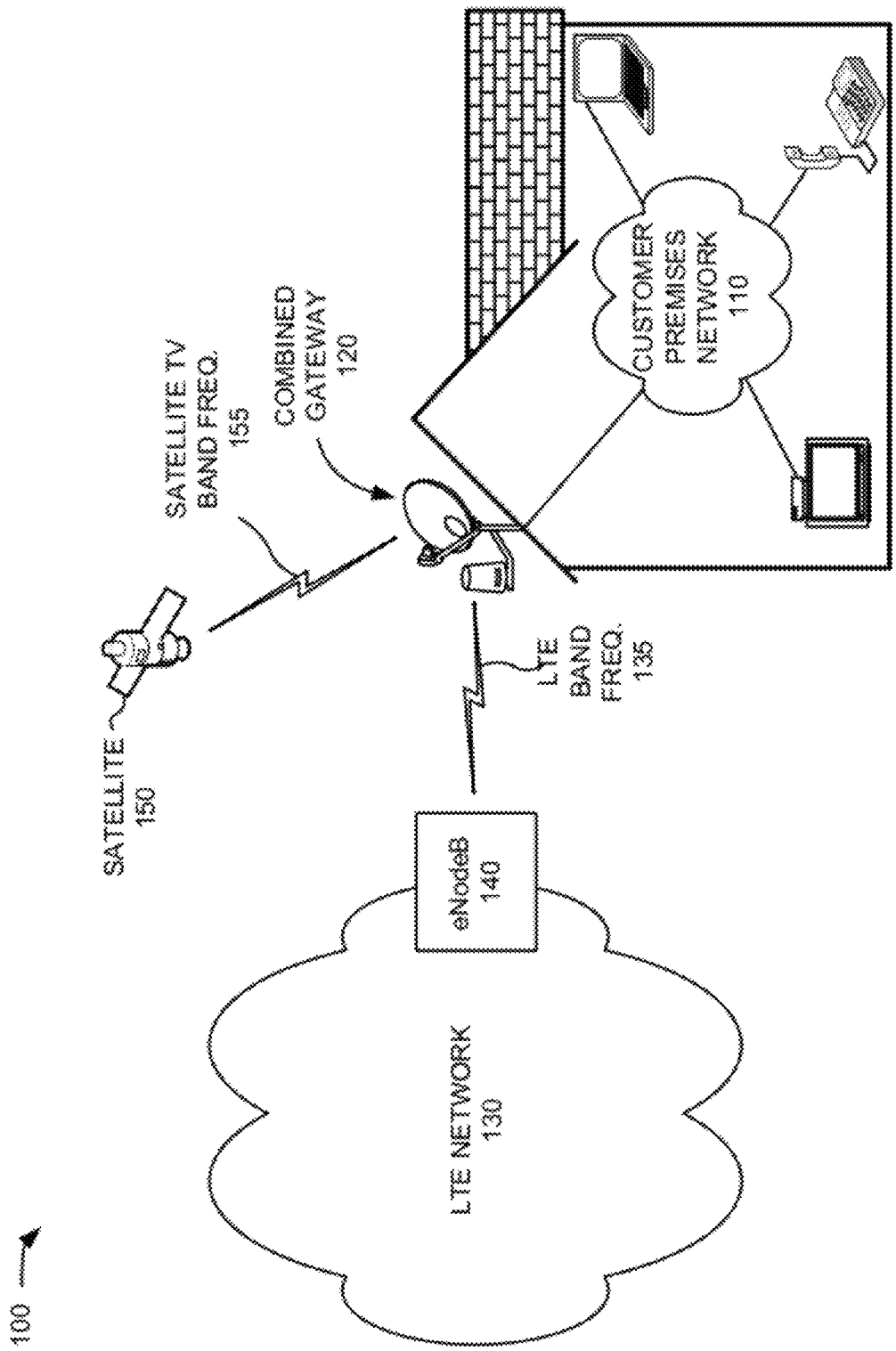
FIG. 1 is a diagram illustrating an example of components of a system according to an implementation described herein.

FIG. 1 is a diagram of a system 100 according to an implementation described herein. As shown in FIG. 1, system 100 may include a CP network 110, an LTE network 130, and a satellite 150.

Customer premises network 110 may include a combined gateway 120 and one or more devices connected to each other at a particular location serviced by combined gateway 120. Devices in customer premise network 110 may include, for example, set-top boxes (STBs), televisions, computers, voice-over-Internet-protocol (VoIP) devices, home networking equipment (e.g., routers, cables, splitters, local gateways, etc.), etc. Devices within customer premises network 110 may be connected via wired connections (e.g., coaxial cable, Telecommunications Industry Association (TIA) Category 5 ("Cat 5") cable, TIA Cat 3 cable, etc.) and/or wireless connections (e.g., using network devices such as those available under the IEEE 802.11 wireless local area network (LAN) standards).

Customer premises network 110 may connect to LTE network 130 through a two-way wireless connection using LTE band frequency signals 135 and connected to satellite 150 through a two-way (e.g., downlink providing video content and uplink carrying control messages for Single Wire Multi-switch (SWiM) circuits) wireless connection using a satellite TV band frequency signals 155. Customer premises network 110 may combine LTE functionality with satellite TV service.

Using combined gateway 120 that includes an outdoor LTE modem, both broadband (over LTE) service and satellite TV service (e.g., via satellite 150) may be brought into customer premises network 110 over, for example, a single coaxial line.

Customer premises network 110 may prioritize traffic based on particular QoS classes associated with particular packets based on a type of traffic. In one implementation, customer premises network 110 may use a QoS mechanism based on DSCP. DSCP may include a networking architecture that provides QoS guarantees in an IP network. The DSCP QoS classes may not be visible to LTE network 130. For example, in one implementation, customer premises network 110 may use 9 different DSCP QoS classes, such as a voice QoS class, a video telephony QoS class, a video streaming QoS class, a real-time gaming QoS class, an application signaling QoS class, a first third party hosted application QoS class, a second third party hosted application QoS class, a premium access Internet traffic QoS class, and a best effort Internet traffic QoS class. Each QoS class may be associated with a different priority. For example, QoS classes associated with real-time data delivery, such as voice, video telephony, and/or video streaming may be given a higher priority than QoS classes associated with data transfer, such as a premium access Internet traffic QoS class or a best effort Internet traffic QoS class. In another implementation, customer premises network 110 may include fewer, additional, or different QoS classes.

LTE network 130 may include a core network architecture of the Third Generation Partnership Project (3GPP) LTE wireless communication standard (e.g., an evolved packet core (EPC) network). LTE network 130 may include an all-IP packet-switched core network that supports high-speed wireless and wireline broadband access technologies. Additionally, LTE network 120 may provide packet-switched voice services (e.g., which are traditionally circuit-switched) using an Internet Protocol Multimedia Subsystem (IMS) network (not shown in FIG. 1). LTE network 130 may include eNodeB 140.

LTE network 130 may prioritize traffic based on LTE QoS class identifiers (QCIs). The LTE QoS classes may not be visible to customer premises network 110. For example, in one implementation, LTE network 130 may use 9 different QoS classes, such as a voice QoS class, a video telephony QoS class, a video streaming QoS class, a real-time gaming QoS class, an application signaling QoS class, a first third party hosted application QoS class, a second third party hosted application QoS class, a premium access Internet traffic QoS class, and a best effort Internet traffic QoS class. Each QoS class may be associated with a different priority. For example, QoS classes associated with real-time data delivery, such as voice, video telephony, and/or video streaming may be given a higher priority than QoS classes associated with data transfer, such as a premium access Internet traffic QoS class or a best effort Internet traffic QoS class. In another implementation, LTE network 130 may include fewer, additional, or different QoS classes.

eNodeB 140 may include an LTE base station that may cover a particular geographic area serviced by LTE network 130. eNodeB 140 may include one or more devices that receive information, such as voice, video, text, and/or other data, from network devices and/or that transmit the information to customer premises network 110 via an air interface. eNodeB 140 may also include one or more devices that receive information from devices in customer premises network 110 via an air interface and/or that transmit the information to other network devices.

Satellite 150 may provide multimedia content from, for example, a direct broadcast satellite (DBS) service provider (not shown in FIG. 1). Satellite 150 may provide a downlink signal over a designated satellite TV band frequency, typically in the range of 950 MHz to 2150 MHz. The downlink signal may be received using a satellite antenna/receiver system at a customer premises to present satellite TV content to a user.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
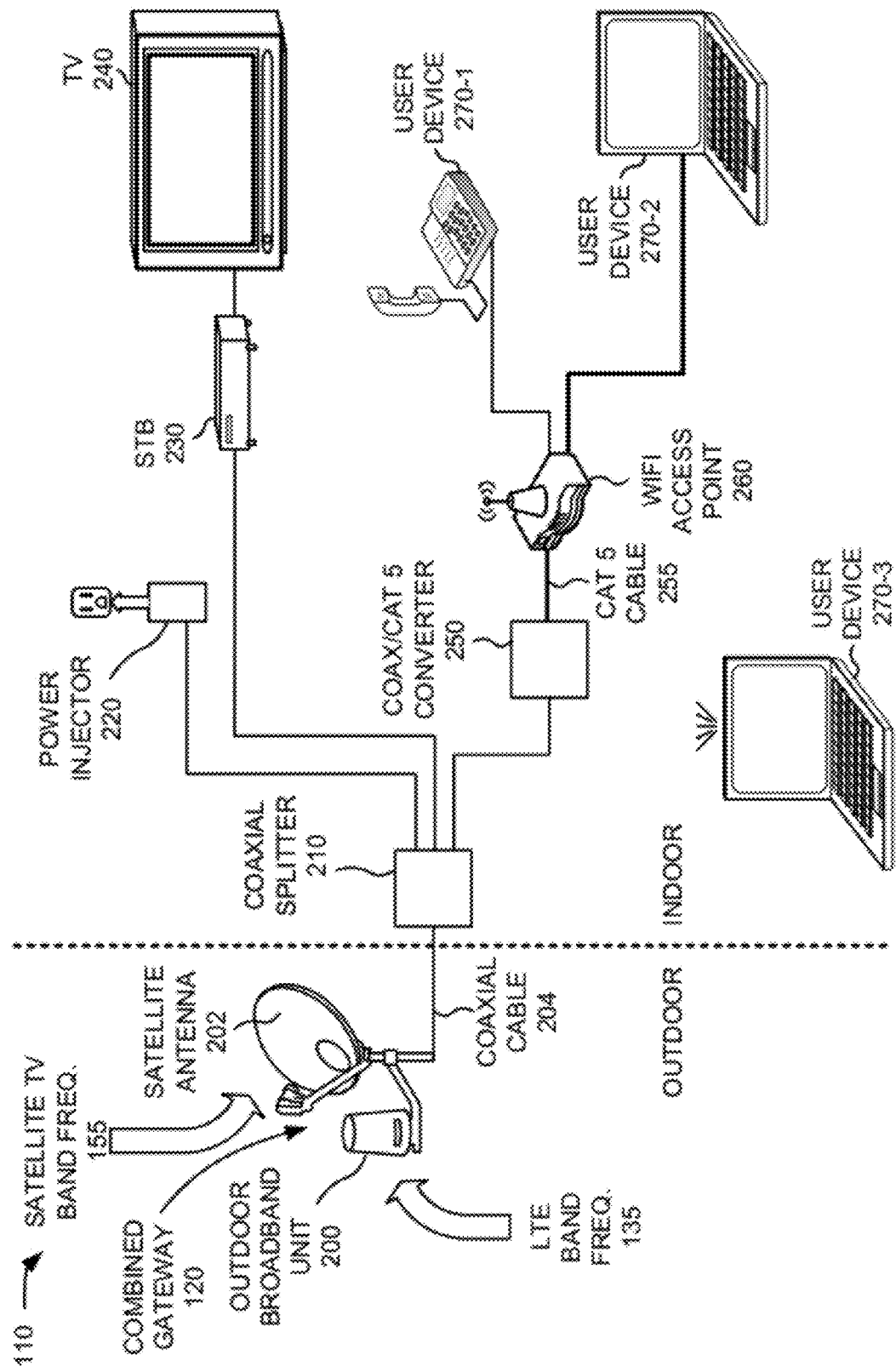
FIG. 2 is a diagram illustrating an example customer premises network of the system depicted in FIG. 1 according to an implementation described herein.

FIG. 2 is a diagram of customer premises network 110 according to an implementation described herein. As shown in FIG. 2, customer premises network 110 may include combined gateway 120, a coaxial splitter 210, a power injector 220, a set-top box (STB) 230, a television 240, a coax/Cat 5 converter 250, a WiFi access point 260, and user devices 270-1, 270-2, and 270-3 (referred to herein collectively as "user devices 270" or individually as "user device 270"). A single coaxial splitter 210, power injector 220, STB 230, television 240, coax/Cat 5 converter 250, and local router 260, and three user devices 270 have been illustrated in FIG. 2 for simplicity. In practice, there may be more (or fewer) outdoor coaxial splitters 210, power injectors 220, STBs 230, televisions 240, coax/Cat 5 converters 250, local routers 260, and/or user devices 270.

Combined gateway 120 may include an outdoor broadband unit 200 and a satellite antenna 202. Outdoor broadband unit 200 may include one or more data processing and/or data transfer devices, such as a gateway, a router, a modem, a switch, a firewall, a network interface card, a hub, a bridge, a proxy server, an optical add-drop multiplexer (OADM), and/or some other type of device that processes and/or transfers data. In one example, outdoor broadband unit 200 may include a wireless gateway that provides a convergence point between wireless protocols (e.g., associated with eNodeB 140) and IP protocols (e.g., associated with user devices 270). Outdoor broadband unit 200 may be physically deployed with satellite antenna 202 (e.g., on a roof or a side wall of a house associated with customer premises network 110). For example, outdoor broadband unit 200 may utilize a pre-existing or new satellite TV installation in a way that both broadband (over LTE) service and satellite TV are brought indoors (e.g., inside the customer premises) over, for example, a single coaxial cable 204. Components of outdoor broadband unit 200 may also be powered using coaxial cable 204.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitter 210 may include splitting technologies to filter LTE and satellite TV signals. In one implementation, coaxial splitter 210 may include a SWiM splitter. For example, coaxial splitter 210 may facilitate allocating logical channels using different frequency blocks for viewer-selected television programming and broadband signals to SWiM-compatible STB 230 and/or WiFi access point 260.

Power injector 220 may include a mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 adapter 250 may include a device to convert incoming signals from coaxial cables to outgoing signals on Cat 5 cables.

WiFi access point 260 may include a device that acts as a wireless access point that employs one or more short-range wireless communication protocols for a wireless personal area network (WPAN) and/or a wireless local area network (WLAN). In one implementation, WiFi access point 260 may use an IEEE 802.11 (e.g., WiFi) protocol and/or an IEEE 802.15 (e.g., Bluetooth) protocol. In another implementation, WiFi access point 260 may use a different short-range wireless protocol and/or a different set of frequencies. Additionally, WiFi access point 260 may include a local router that provides connectivity between equipment within customer premises network 110 (e.g., user devices 270) and between the customer premises network 110 and an external network (e.g., LTE network 130), and may also include one or more wired (e.g., Ethernet, TIA Cat 3 cables) connections.

User device 270 may include any device that is capable of communicating with customer premises network 110 via WiFi access point 260 (or via another local router). For example, user device 270 may include a mobile computation and/or communication device, such as a laptop computer, a VoIP-enabled device, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a VoIP-enabled device phone base, a personal computer, a gaming system, etc.

In an implementation described herein, customer premises equipment for wireless broadband service can be integrated with the satellite TV MoCA and SWiM environment to provide both TV services and broadband wireless service. With this architecture, the combination of outdoor broadband unit 200 and satellite antenna 202 may follow a channelization plan dubbed "Mid-RF" (475-625 MHz), requiring a single coax line (e.g., coaxial cable 204) in the deployment. Coaxial cable 204 may feed the in-home coaxial installation to deliver the satellite TV services to the corresponding STBs 230/televisions 240 and LTE services to WiFi access point 260/user devices 270.

Although FIG. 2 shows example components of customer premises network 110, in other implementations, customer premises network 110 may include fewer components, different components, differently arranged components, and/or additional components than those depicted in FIG. 2. Alternatively, or additionally, one or more components of customer premises network 110 may perform one or more tasks described as being performed by one or more other components of customer premises network 110.

Figure 3:
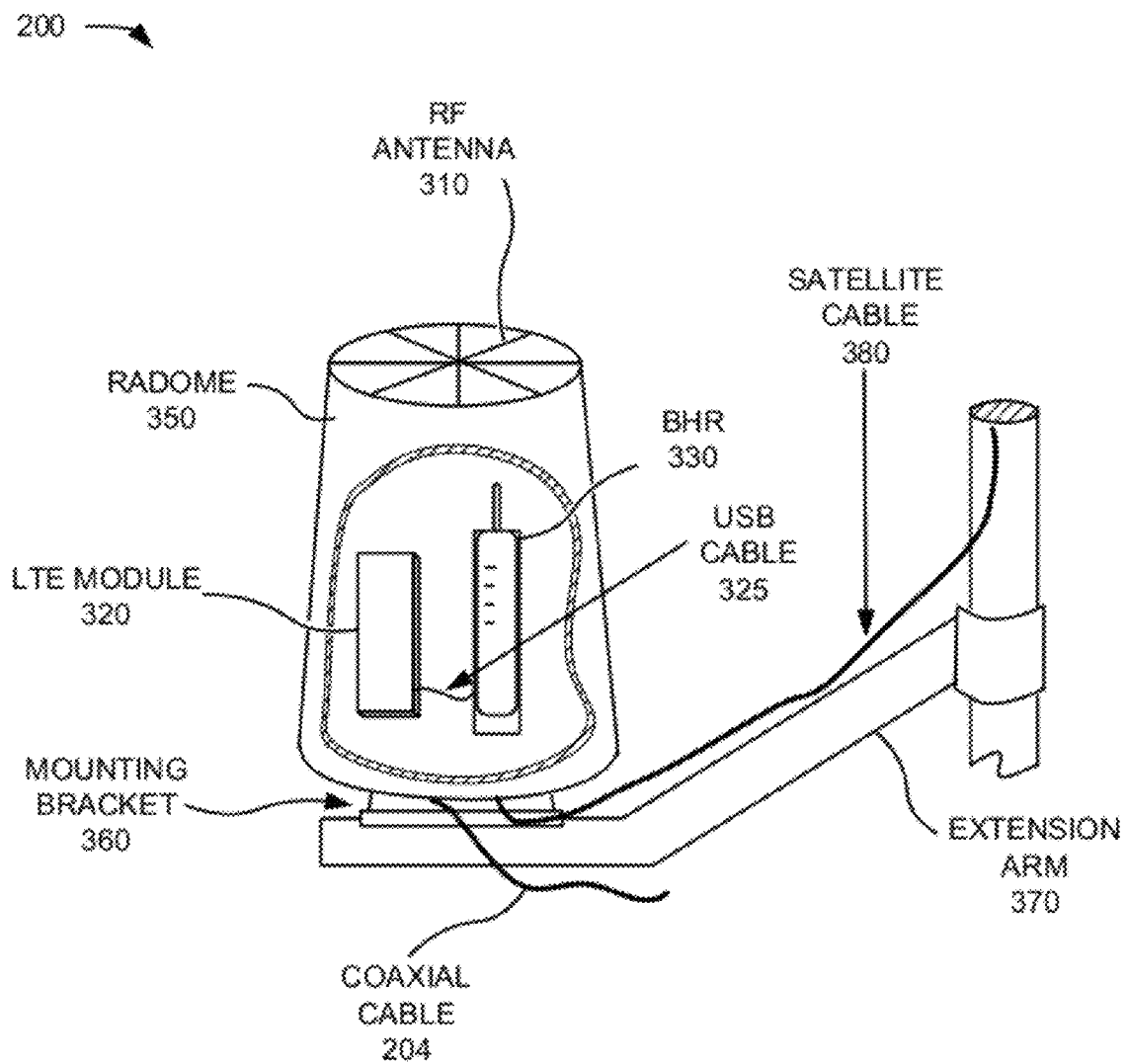
FIG. 3 is a diagram of example components of an outdoor broadband unit of the customer premises network depicted in FIG. 2 according to an implementation described herein.

FIG. 3 is a diagram of example components of an outdoor broadband unit 200. As shown in FIG. 3, outdoor broadband unit 200 may include a radio frequency (RF) antenna 310, an LTE module 320, a universal serial bus (USB) cable 325, a BHR 330, a radome 350, a mounting bracket 360, an extension arm 370, and a satellite cable 380.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station (e.g., eNodeB 140) connected to a network (e.g., LTE network 130) to send and/or receive signals from user devices 270. In implementations herein, RF antenna 310 may be enclosed by radome 350, integrated with radome 350, or external to radome 350. While one RF antenna 310 is shown in FIG. 3, outdoor broadband unit 200 may include more than one antenna in other implementations.

LTE module 320 may include hardware or a combination of hardware and software having communication capability via an air interface. For example, LTE module 320 may receive broadband signals and/or VoIP signals from eNodeB 140 (e.g., via RF antenna 310) and transmit broadband signals and/or VoIP signals to eNodeB 140 (e.g., via RF antenna 310). LTE module 320 may communicate with BHR 330 via USB cable 325.

BHR 330 may include one or more devices that buffer and forward data packets toward destinations. For example, BHR 330 may receive data packets from eNodeB 140 (e.g., via LTE module 320) and forward the data packets toward user devices 270. In addition, BHR 330 may receive data packets from user devices 270 (e.g., via WiFi access point 260) and forward the data packets toward recipient devices (e.g., a service provider) via LTE network 130. BHR 330 may include a bridge device to receive signals from LTE module 320 via USB cable 325 and convert the signals to an Ethernet over coax signal. The Ethernet over coax signal may be assigned a logical channel (e.g., according to SWiM guidelines) and may be combined with coaxial input from satellite antenna 202. In one implementation, the output from BHR 330 may be inserted in a MoCA channel that is separate from the 950 MHz to 2150 MHz range of a typical satellite TV system.

Radome 350 (shown with cut-away view to reveal LTE module 320, USB cable 325, and BHR 330) may provide a weatherproof enclosure to protect RF antenna 310, LTE module 320, USB cable 325, BHR 330, and/or other components of outdoor broadband unit 200. Radome 340 may include any RF transparent structure that protects components in an outdoor environment.

Mounting bracket 360 may include a mechanism to secure radome 350 and the enclosed components (e.g., RF antenna 310, LTE module 320, BHR 330, and/or other components) of outdoor broadband unit 200 to extension arm 370. Mounting bracket 360 may include one or more mounting holes for accepting fasteners, such as machine screws, for use in attaching outdoor broadband unit 200 to mounting bracket 360 and/or extension arm 370.

Extension arm 370 may provide a support structure to support outdoor broadband unit 200 (e.g., via mounting bracket 360). In one implementation, extension arm 370 may be connected to a pole supporting satellite antenna 202. In other implementations, extension arm 370 may be connected to another structure. Satellite cable 380 may provide a wired connection between satellite antenna 202 and BHR 330.

Although FIG. 3 shows example components of outdoor broadband unit 200, in other implementations, outdoor broadband unit 200 may include fewer components, different components, differently arranged components, and/or additional components than depicted in FIG. 3. Alternatively, or additionally, one or more components of outdoor broadband unit 200 may perform one or more other tasks described as being performed by one or more components of outdoor broadband unit 200.

Figure 4:
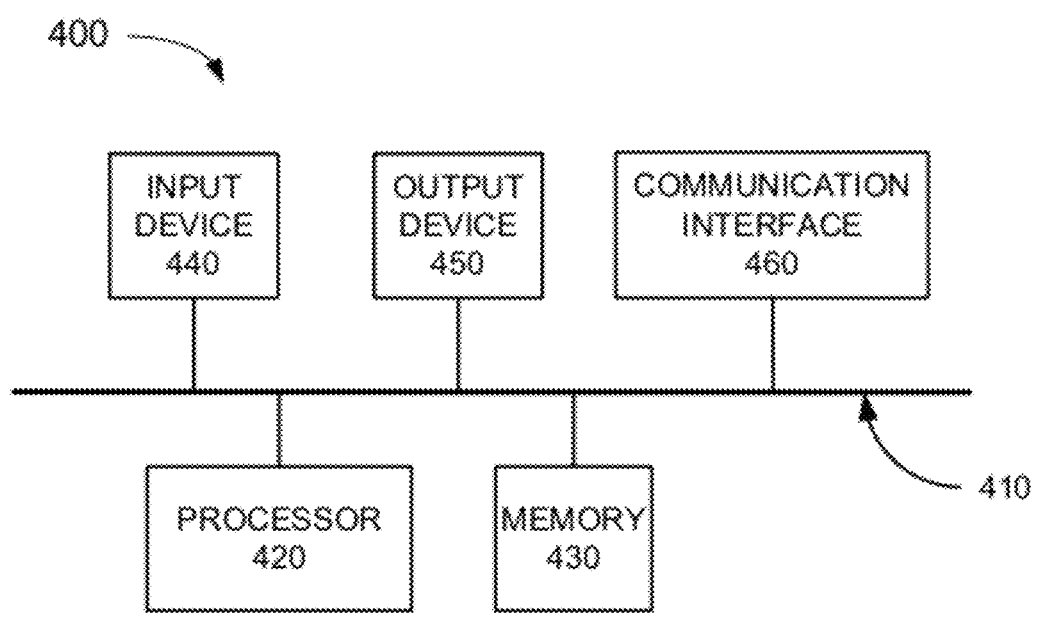
FIG. 4 is a diagram illustrating example components of one of the devices depicted in FIG. 2 according to an implementation described herein.

FIG. 4 is a diagram of example components of a device 400 that may correspond to one of the devices of customer premises network 110. For example, device 440 may corresponds to BHR 330 and/or WiFi access point 260. As shown in FIG. 4, device 400 may include a bus 410, a processor 420, a memory 430, an input device 440, an output device 450, and a communication interface 460.

Bus 410 may permit communication among the components of device 400. Processor 420 may include one or more processors, microprocessors, and/or processing logic (e.g., application specific integrated circuits (ASICs) or field programmable gate arrays (FPGAs)) that may interpret and execute instructions.

Memory 430 may include a random access memory (RAM) or another type of dynamic storage device that stores information and instructions for execution by processor 420, a read only memory (ROM) or another type of static storage device that stores static information and instructions for processor 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as one or more light indicators (e.g., light emitting diodes (LEDs)), a display, a speaker, etc.

Communication interface 460 may include any transceiver-like mechanism that enables device 400 to communicate with other devices and/or systems. For example, communication interface 460 may include mechanisms for communicating with other devices, such as other devices of system 100 and/or customer premises network 110. For example, communication interface 460 may include a modem, a network interface card, and/or a wireless interface card.

As described herein, device 400 may perform certain operations in response to processor 420 executing software instructions contained in a computer-readable medium, such as memory 430. A computer-readable medium may be defined as a physical or logical memory device. A logical memory device may include memory space within a single physical memory device or spread across multiple physical memory devices. The software instructions may be read into memory 430 from another computer-readable medium or from another device via communication interface 460. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more tasks described as being performed by one or more other components of device 400.

Figure 5:
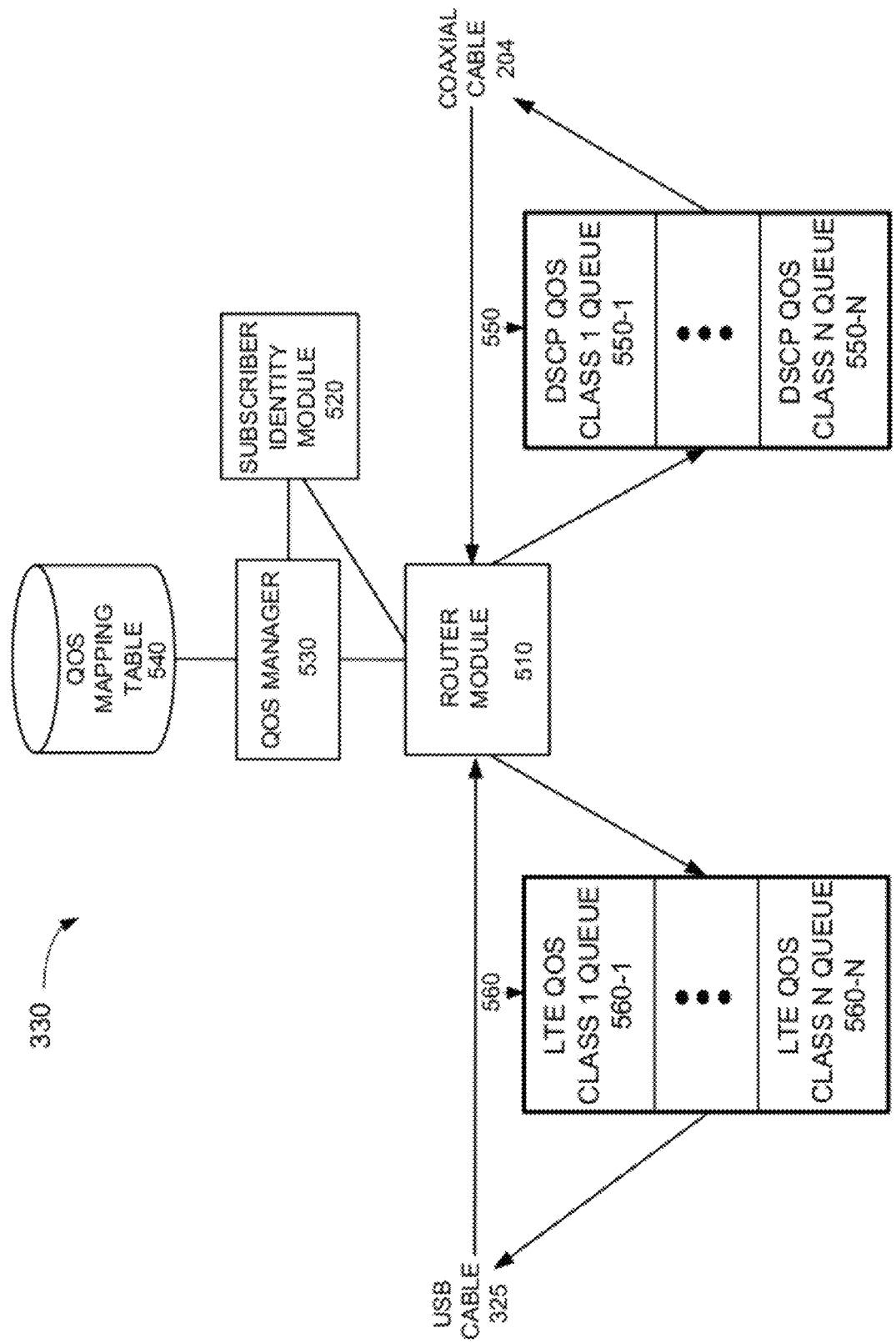
FIG. 5 is a diagram illustrating an example of functional components of the broadband home router depicted in FIG. 3 according to an implementation described herein.

FIG. 5 is a diagram illustrating an example of functional components of BHR 330 according to an implementation described herein. As shown in FIG. 5, BHR 330 may include a router module 510, a Subscriber Identity Module (SIM) 520, a QoS manager 530, a QoS mapping table 540, one or more DSCP QoS class queues 550 (referred to collectively as "DSCP QoS class queues 550" and individually as "DSCP class queue 550"), and one or more LTE QoS class queues 560 (referred to collectively as "LTE QoS class queues 560" and individually as "LTE class queue 560").

Router module 510 may receive a packet from eNodeB 140 via LTE module 320 and USB cable 325, determine a destination, for the received packet, of a particular device in customer premises network 110, and may forward the packet toward the particular device. Router 510 may receive a particular DSCP QoS class assignment for the packet from QoS manager 530 and may forward the packet to a particular DSCP QoS class queue 550 associated with the assigned QoS class. Router module 520 may receive a packet from a particular device in customer premises network 110 and may forward the packet to eNodeB 140 via USB cable 325 and LTE module 320. Router 510 may receive a particular LTE QoS class assignment for the packet from QoS manager 530 and may forward the packet to a particular LTE QoS class queue 560 associated with the assigned LTE class.

Router module 510 may also act as an IP access point for devices in customer premises network 110. For example, a user may download a movie to a computer (e.g., user device 270-2), and may stream the downloaded movie to TV 240 through BHR 330. In such a case, router module 510 may act as a device that routes packets from user device 270-2 to TV 240 (or from any other device in customer premises network 110 to any other device in customer premises network 110). Furthermore, router module 510 may download a subscription profile and store the subscription profile in SIM 520.

SIM 520 may store information about a particular subscription associated with services provided by BHR 330 to customer premises network 110. For example, SIM 520 may store a user's identity in association with LTE network 130. For example, in one implementation, LTE network 130 may perceive BHR 330 as user equipment (UE) and may not distinguish BHR 330 from another UE, such as a mobile communication device. Thus, for example, SIM 520 may store such LTE parameters as a Globally Unique Temporary Identifier (GUTI) assigned to BHR 330 by a mobility management entity (MME) associated with eNodeB 140, a Mobile Subscriber International Services Digital Network Number (MSISDN), International Mobile Subscriber Identity (IMSI), or any other identifier associated with LTE network 130. In another implementation, LTE network 130 may be able to identify BHR 330 as a fixed wireless device, and SIM 520 may include one or more identifiers specifically associated with fixed wireless devices.

SIM 520 may further store information about particular services associated with the subscription, such as, for example, whether the customer has purchased particular services associated with particular LTE, DSCP, a total data limit associated with the subscription, and/or WiFi QoS classes and/or particular data or bandwidth limits associated with particular LTE, DSCP, and/or WiFi QoS classes.

In one implementation, SIM 520 may be implemented in a storage device included as part of memory 430 of BHR 330. In another implementation, SIM 520 may be stored in a memory associated with another device or a group of devices, separate from or including memory 430 of BHR 330, such as, for example, a removable memory card.

QoS manager 530 may determine a particular LTE QoS class for a packet received from LTE network 130, may determine a corresponding DSCP QoS class to which the particular LTE QoS class is mapped by accessing QoS mapping table 540, and may assign the corresponding DSCP QoS class, or a DSCP QoS class of lower priority, to the packet, based on subscription information stored in SIM 520 and based on available bandwidth.

QoS manager 530 may determine a particular DSCP QoS class for a packet received from customer network 110, may determine a corresponding LTE QoS class to which the particular DSCP QoS class is mapped by accessing QoS mapping table 540, and may assign the corresponding LTE QoS class, or an LTE QoS class of lower priority, to the packet, based on subscription information stored in SIM 520 and based on available bandwidth.

QoS mapping table 540 may store a table that maps a particular LTE QoS class to a particular DSCP QoS class or a particular DSCP QoS class to a particular LTE QoS class. Example fields that may be stored in QoS mapping table 540 are described below with reference to FIG. 6.

DSCP QoS class queues 550 may include a particular queue associated with a particular DSCP QoS class. DSCP QoS class queues 550 may store packets that are to be sent to a particular device in customer network 110. Packets may be forwarded from a particular DSCP QoS class queue 550 based on a priority associated with the particular DSCP QoS class with which the packets are associated. For example, packets in DSCP QoS class queue 550-1 may be given priority over packets in DSCP QoS class queue 550-2, which may be given priority over packets in DSCP QoS class queue 550-3, etc.

LTE QoS class queues 560 may include a particular queue associated with a particular LTE QoS class. LTE QoS class queues 560 may store packets that are to be sent to LTE network 130. Packets may be forwarded from a particular LTE QoS class queue 560 based on a priority associated with the particular LTE QoS class queue with which the packets are associated. For example, packets in LTE QoS class queue 560-1 may be given priority over packets in LTE QoS class queue 550-3, which may be given priority over packets in LTE QoS class queue 550-3, etc.

Although FIG. 5 shows example functional components of BHR 330, in other implementations, BHR 330 may include fewer functional components, different functional components, differently arranged functional components, or additional functional components than depicted in FIG. 5. Additionally or alternatively, one or more functional components of BHR 330 may perform one or more tasks described as being performed by one or more other functional components of BHR 330.

FIG. 6 is a diagram of example fields that may be stored within QoS mapping table 540 according to an implementation described herein. In one implementation, QoS mapping table 540 may be implemented in a storage device included as part of memory 430 of BHR 330. In another implementation, QoS mapping table 540 may be stored in a memory associated with another device or a group of devices, separate from or including memory 430 of BHR 330.

As shown in FIG. 6, QoS mapping table 540 may include a QoS class identifier column field 610, an LTE QoS class column field 620, and a DSCP QoS class column field 630. A particular entry in LTE QoS class column field 620 may be associated with a particular entry in DSCP QoS class column field 630.

QoS class identifier column field 610 may include a voice entry 611, a video telephony entry 612, a video streaming entry 613, a real-time gaming entry 614, an application signaling entry 615, a first third party hosted application entry 616, a second third party hosted application entry 617, a premium access Internet traffic entry 618, and a best effort Internet traffic entry 619. LTE QoS class column field 620 may include LTE QCI 1 entry 621 to LTE QCI 9 entry 629. DSCP QoS class column field 630 may include DSCP QoS class 1 entry 631 to DSCP QoS class 9 entry 639.

Voice entry 611 may identify traffic as being associated with a Voice over IP (VoIP) application and/or service or other traffic that carries real-time voice data, and may associate LTE QCI 1 entry 621 with DSCP QoS class 1 entry 631 to map LTE QCI 1 to DSCP QoS class 1 or vice versa.

Video telephony entry 612 may identify traffic as being associated with a video conferencing application or other traffic that carries both real-time audio and real-time video data, and may associate LTE QCI class 2 entry 622 with DSCP QoS class 2 entry 632 to map LTE QCI 2 to DSCP QoS class 2 or vice versa.

Video streaming entry 613 may identify traffic as being associated with a one-way real-time video stream, and may associate LTE QCI 3 entry 623 with DSCP QoS class 3 entry 633 to map LTE QCI 3 to DSCP QoS class 3 or vice versa.

Real-time gaming entry 614 may identify traffic as being associated with a real-time gaming application, and may associate LTE QCI 4 entry 624 with DSCP QoS class 4 entry 634 to map LTE QCI 4 to DSCP QoS class 4 or vice versa.

Application signaling entry 615 may identify traffic as being associated with signals being exchanged by applications and may associate LTE QCI 5 entry 625 with DSCP QoS class 5 entry 635 to map LTE QCI 5 to DSCP QoS class 5 or vice versa.

First third party hosted application entry 616 may be dedicated to traffic associated with a third party application (e.g., an application not provided by customer services network 110 or LTE network 130) and may associate LTE QCI 6 entry 626 with DSCP QoS class 6 entry 636 to map LTE QCI 6 to DSCP QoS class 6 or vice versa. Second third party hosted application entry 617 may be an additional QoS class dedicated to traffic associated with a third party application and may associate LTE QCI 7 entry 627 with DSCP QoS class 7 entry 637 to map LTE QCI 7 to DSCP QoS class 7 or vice versa.

Premium access Internet traffic entry 618 may identify data traffic (e.g., file transfers, downloads, and/or Web page requests) that is given a higher priority than best effort Internet traffic and may associate LTE QCI 8 entry 628 with DSCP QoS class 8 entry 638 to map LTE QCI 8 to DSCP QoS class 8 or vice versa.

Best effort Internet traffic entry 619 may identify best effort Internet traffic (e.g., file transfers, downloads, and/or Web page requests) that is not associated with any guarantees that data will be delivered or that the data will be given a particular priority (e.g., delivery may depend on a current traffic load) and may associate LTE QCI 9 entry 629 with DSCP QoS class 9 entry 639 to map LTE QCI 9 to DSCP QoS class 9 or vice versa.

Although FIG. 6 shows example entries of QoS mapping table 540, in other implementations, QoS mapping table 540 may include fewer entries, different entries, additional entries, or differently arranged entries than depicted in FIG. 6. Additionally or alternatively, one or more entries of QoS mapping table 540 may include information described as being included in one or more other entries of QoS mapping table 540.

FIG. 7 is a diagram illustrating an example of functional components of WiFi access point 260 according to an implementation described herein. As shown in FIG. 7, WiFi access point 260 may include a WiFi router 710, a QoS manager 730, a QoS mapping table 740, one or more WiFi QoS class queues 750 (referred to collectively as "WiFi QoS class queues 750" and individually as "WiFi class queue 750"), WiFi transceiver 755, and one or more DSCP QoS class queues 760 (referred to collectively as "DSCP QoS class queues 560" and individually as "DSCP class queue 560").

WiFi router 710 may receive a packet from BHR 330 (or another device in customer premises network 110) via Cat 5 cable 255, determine a destination, for the received packet, of a particular device communicating wirelessly with WiFi access point 260 (e.g., customer device 270-3), and may forward the packet to the particular device. WiFi router 710 may receive a particular WiFi QoS class assignment for the packet from QoS manager 730 and may forward the packet to a particular WiFi QoS class queue 750 associated with the assigned WiFi QoS class. WiFi router 710 may receive a packet from a particular device communicating wirelessly with WiFi access point 260 (e.g., customer device 270-3) and may forward the packet to BHR 330 via Cat 5 cable 255. WiFi router 710 may receive a particular WiFi QoS class assignment for the packet from QoS manager 730 and may forward the packet to a particular DSCP QoS class queue 760 associated with the assigned DSCP class.

QoS manager 730 may determine a particular DSCP QoS class for a packet received from BHR 330 (or another device in customer premises network 110), may determine a corresponding WiFi QoS class to which the particular DSCP QoS class is mapped by accessing QoS mapping table 740, and may assign the corresponding WiFi QoS class, or a WiFi QoS class of lower priority, to the packet based on available bandwidth.

QoS manager 730 may determine a particular DSCP QoS class for a packet received from a particular device communicating wirelessly with WiFi access point 260 (e.g., customer device 270-3), may determine a corresponding DSCP QoS class to which the particular WiFi QoS class is mapped by accessing QoS mapping table 740, and may assign the corresponding DSCP QoS class, or a DSCP QoS class of lower priority, to the packet based on available bandwidth.

QoS mapping table 740 may store a table that maps a particular WiFi QoS class to a particular DSCP QoS class or a particular DSCP QoS class to a particular WiFi QoS class. Example fields that may be stored in QoS mapping table 740 are described below with reference to FIG. 8.

WiFi QoS class queues 750 may include a particular queue associated with a particular WiFi QoS class. WiFi QoS class queues 750 may store packets that are to be sent to a particular device communicating wirelessly with WiFi access point 260 (e.g., customer device 270-3). Packets may be forwarded from a particular WiFi QoS class queue 750 based on a priority associated with the particular WiFi QoS class queue with which the packets are associated. For example, packets in WiFi QoS class queue 750-1 may be given priority over packets in WiFi QoS class queue 750-2, which may be given priority over packets in WiFi QoS class queue 750-3, etc.

WiFi transceiver 755 may receive packets, via wireless signals, from a particular device communicating with WiFi access point 760 (e.g., user device 270-3), and forward the packets to WiFi router 710. WiFi transceiver 755 may also receive packets from WiFi QoS class queues 750 and transmit the packets, via wireless signals, based on priorities associated with particular ones of WiFi QoS class queues 750, to a particular device communicating with WiFi access point 760 (e.g., user device 270-3).

DSCP QoS class queues 760 may include a particular queue associated with a particular DSCP QoS class. DSCP QoS class queues 760 may store packets that are to be sent to BHR 330 (or to another device in customer premises network 110). Packets may be forwarded from a particular DSCP QoS class queue 760 based on a priority associated with the particular DSCP QoS class queue with which the packets are associated. For example, packets in DSCP QoS class queue 760-1 may be given priority over packets in DSCP QoS class queue 750-3, which may be given priority over packets in DSCP QoS class queue 750-3, etc.

Although FIG. 7 shows example functional components of WiFi access point 260, in other implementations, WiFi access point 260 may include fewer functional components, different functional components, differently arranged functional components, or additional functional components than depicted in FIG. 7. Additionally or alternatively, one or more functional components of WiFi access point 260 may perform one or more tasks described as being performed by one or more other functional components of WiFi access point 260.

FIG. 8 is a diagram of example fields that may be stored within the QoS mapping table 740 according to an implementation described herein. In one implementation, QoS mapping table 740 may be implemented in a storage device included as part of memory 430 of WiFi access point 260. In another implementation, QoS mapping table 740 may be stored in a memory associated with another device or a group of devices, separate from or including memory 430 of WiFi access point 260. As shown in FIG. 8, QoS mapping table 740 may include a QoS class identifier column field 810, a WiFi QoS class column field 820, and a DSCP QoS class column field 830. A particular entry in WiFi QoS class column field 820 may be associated with a particular entry in DSCP QoS class column field 830.

QoS class identifier column field 810 may include a voice entry 811, a video telephony entry 812, a video streaming entry 813, a real-time gaming entry 814, an application signaling entry 815, a first third party hosted application entry 816, a second third party hosted application entry 817, a premium access Internet traffic entry 818, and a best effort Internet traffic entry 819. LTE QoS class column field 820 may include WiFi QoS class 1 entry 821 to WiFi QoS class 9 entry 829. DSCP QoS class column field 830 may include DSCP QoS class 1 entry 831 to DSCP QoS class 9 entry 839.

Voice entry 811 may identify traffic as being associated with a Voice over IP (VoIP) application and/or service or other traffic that carries real-time voice data, and may associate QCI WiFi QoS class 1 entry 821 with DSCP QoS class 1 entry 831 to map WiFi QoS class 1 to DSCP QoS class 1 or vice versa.

Video telephony entry 812 may identify traffic as being associated with a video conferencing application or other traffic that carries both real-time audio and real-time video data, and may associate WiFi QoS class 2 entry 822 with DSCP QoS class 2 entry 832 to map WiFi QoS class 2 to DSCP QoS class 2 or vice versa.

Video streaming entry 813 may identify traffic as being associated with a one-way real-time video stream, and may associate WiFi QoS class 3 entry 823 with DSCP QoS class 3 entry 833 to map WiFi QoS class 3 to DSCP QoS class 3 or vice versa.

Real-time gaming entry 814 may identify traffic as being associated with a real-time gaming application, and may associate WiFi QoS class 4 entry 824 with DSCP QoS class 4 entry 834 to map WiFi QoS class 4 to DSCP QoS class 4 or vice versa.

Application signaling entry 815 may identify traffic as being associated with signal being exchanged by applications and may associate WiFi QoS class 5 entry 825 with DSCP QoS class 5 entry 835 to map WiFi QoS class 5 to DSCP QoS class 5 or vice versa.

First third party hosted application entry 816 may be dedicated for identifying traffic as being associated with a third party application (e.g., an application not provided by customer services network 110 or LTE network 130) and may associate WiFi QoS class 6 entry 826 with DSCP QoS class 6 entry 836 to map WiFi QoS class 6 to DSCP QoS class 6 or vice versa. Second third party hosted application entry 817 may be an additional QoS class dedicated for identifying traffic as being associated with a third party application and may associate WiFi QoS class 7 entry 827 with DSCP QoS class 7 entry 837 to map WiFi QoS class 7 to DSCP QoS class 7 or vice versa.

Premium access Internet traffic entry 818 may identify data traffic (e.g., file transfers, downloads, and/or Web page requests) that is given a higher priority than best effort Internet traffic and may associate WiFi QoS class 8 entry 828 with DSCP QoS class 8 entry 838 to map WiFi QoS class 8 to DSCP QoS class 8 or vice versa.

Best effort Internet traffic entry 819 may identify best effort Internet traffic (e.g., file transfers, downloads, and/or Web page requests) that is not associated with any guarantees that data will be delivered or that the data will be given a particular priority (e.g., delivery may depend on a current traffic load) and may associate WiFi QoS class 9 entry 829 with DSCP QoS class 9 entry 839 to map WiFi QoS class 9 to DSCP QoS class 9 or vice versa.

Although FIG. 8 shows example entries of QoS mapping table 740, in other implementations, QoS mapping table 740 may include fewer entries, different entries, additional entries, or differently arranged entries than depicted in FIG. 8. Additionally or alternatively, one or more entries of QoS mapping table 740 may include information described as being included in one or more other entries of QoS mapping table 740.

Figure 9:
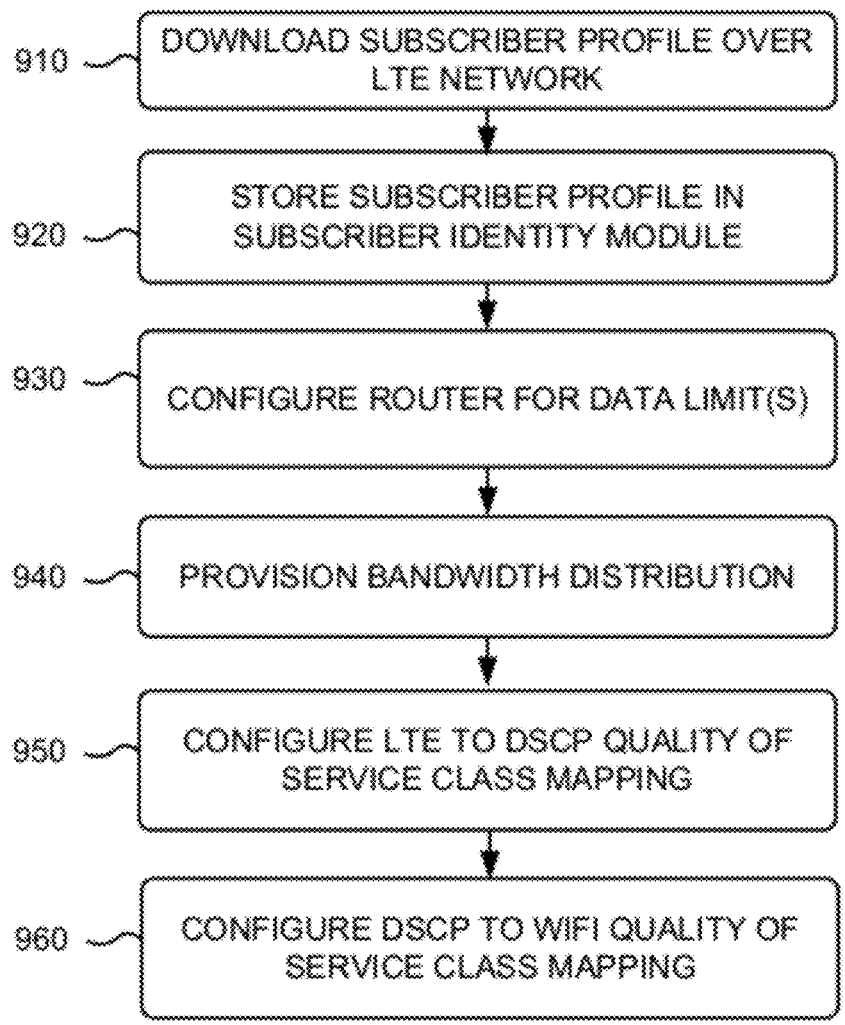
FIG. 9 is a flow diagram illustrating a process for configuring a broadband home router and a WiFi access point according to an implementation described herein.

FIG. 9 is a flow diagram illustrating a process for configuring a broadband home router and a WiFi access point according to an implementation described herein. In one implementation, the process of FIG. 9 may be performed by BHR 330 and/or WiFi access point 260. In other implementations, some or all of the process of FIG. 9 may be performed by another device or a group of devices separate from and/or possibly remote from BHR 330 and WiFi access point 260 and/or including BHR 330 and WiFi access point 260.

The process of FIG. 9 may include downloading a subscriber profile over an LTE network (block 910). For example, BHR 330 may download a subscriber profile, associated with customer premises network 110, from LTE network 130. The subscriber profile may be provided by, for example, a home subscriber server (HSS) associated with LTE network 130. The subscriber profile may include a user's identity in association with LTE network 130, which may include, for example, LTE parameters such as a Globally Unique Temporary Identifier (GUTI) assigned to BHR 330 by a mobility management entity (MME) associated with eNodeB 140, a Mobile Subscriber International Services Digital Network Number (MSISDN), an International Mobile Subscriber Identity (IMSI), or any other identifier associated with LTE network 130. The subscriber profile may further include information about particular services associated with the subscription, such as, for example, whether the customer has purchased particular services associated with particular LTE, DSCP, and/or WiFi QoS classes and/or particular data or bandwidth limits associated with particular LTE, DSCP, and/or WiFi QoS classes. The subscriber profile may be stored in a subscriber identity module (block 920). For example, BHR 330 may store the downloaded user profile in SIM 520.

A router may be configured for data limit(s) (block 930). For example, QoS manager 530 may determine a total bandwidth available to customer premises network 110. For example, in one implementation, a total available bandwidth on coaxial cable 204 available to customer premises network 110 may be 100 mBits/sec, out of which 50 mBits/sec may be dedicated to satellite signals, leaving 50 mBits/sec for signals received from and sent to LTE network 130. A customer may purchase to use a particular percentage of the available 50 mBits/sec.

Provisioning of bandwidth distribution may be performed (block 940). For example, QoS manager 530 may assign a particular bandwidth to a particular QoS class. For example, the customer may purchase a particular bandwidth for a particular QoS class. For example, a first customer may subscribe to a VoIP service, which may be associated with LTE QCI 1, while a second customer may not subscribe to a VoIP service. As another example, a first customer may watch on-demand movies and may purchase additional bandwidth for a video streaming QoS class (e.g., associated with LTE QCI 3), while a second customer may not purchase additional video streaming bandwidth. As yet another example, a first customer may purchase premium access Internet service (e.g., associated with LTE QCI 8), which may guarantee faster bit rates than best effort traffic, while a second customer may not purchase the premium access Internet service and may be satisfied with best effort Internet traffic.

Configuration of an LTE to DSCP QoS mapping may be performed (block 950). For example, QoS manager 530 may populate QoS mapping table 540 based on information included in the subscriber profile and/or based on querying devices in customer premises network 110. For example, the subscriber profile in SIM 520 may include information about a particular QoS marking used in customer premises network 110 (e.g., a DSCP QoS marking). As another example, BHR 330 may query particular devices in customer premises network 110 to determine a QoS marking associated with the particular devices. As yet another example, QoS manager 530 may use DSCP QoS marking as the default and may be set during manufacture to populate QoS mapping table 540 based on the example illustrated in FIG. 6. As yet another example, QoS mapping table 540 may be manually generated based on input provided by an operator during installation, or based on input provided by the customer during operation, via input device 440.

Configuration of a DSCP to WiFi QoS mapping may be performed (block 960). In one implementation, BHR 330 may generate QoS mapping table 740 and provide the generated QoS mapping table 740 to WiFi access point 260. For example, BHR 330 may generate QoS mapping table 740 based on information included in the subscriber profile stored in SIM 520, based on querying particular devices in customer premises network 110, and/or based on a default setting based on the example illustrated in FIG. 8. In another implementation, WiFi access point 260 may generate QoS mapping table 740 independently of BHR 330. For example, WiFi access point 260 may generate QoS mapping table 740 by querying particular devices in customer network 110 or based on a default setting based on the example illustrated in FIG. 8. In yet another implementation, QoS mapping table 740 may be manually generated based on input provided by an operator during installation, or based on input provided by the customer during operation, via input device 440.

Figure 10:
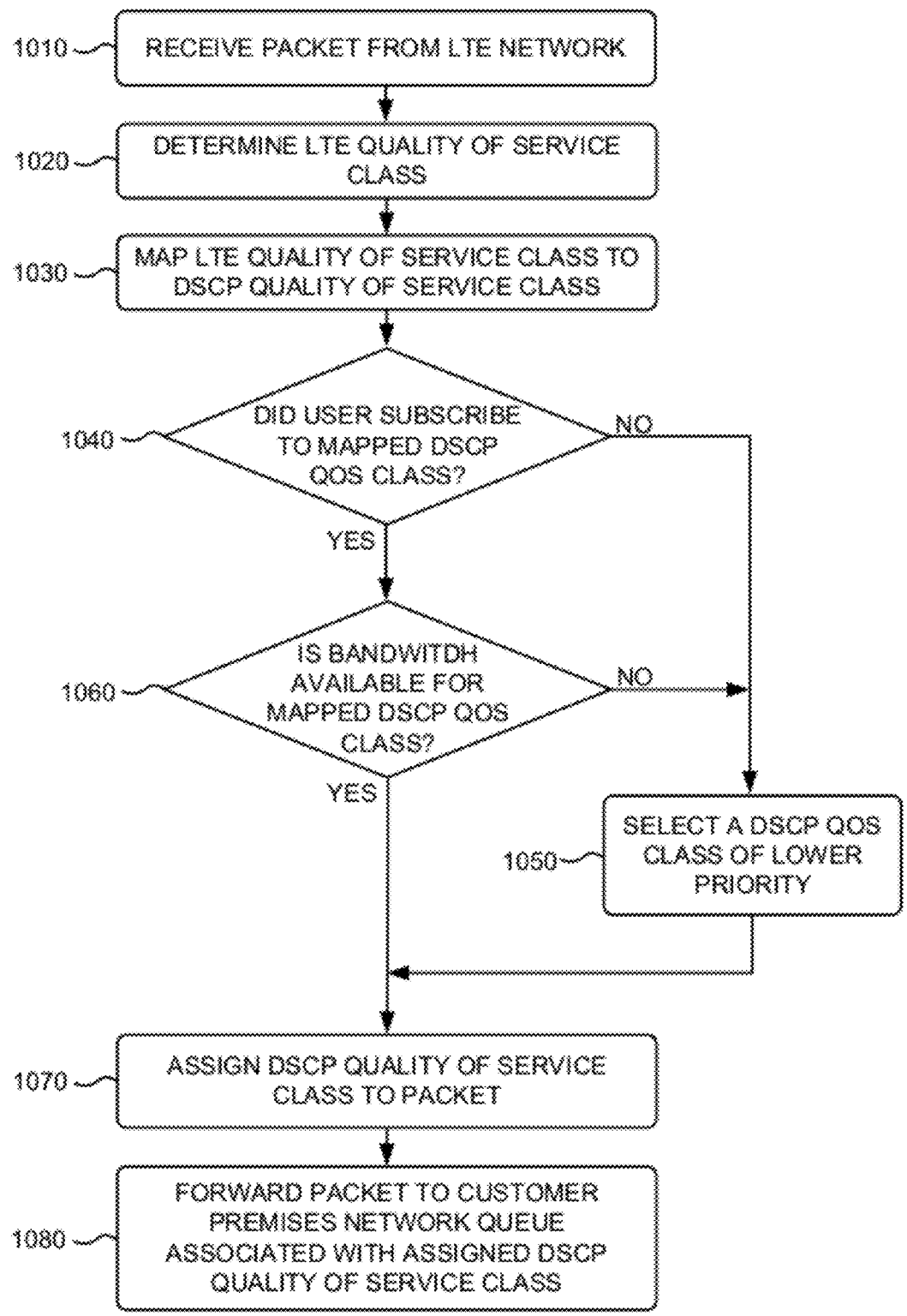
FIG. 10 is a flow diagram illustrating a process of mapping an LTE QoS class to a differentiated services code point (DSCP) QoS class according to an implementation described herein.

FIG. 10 is a flow diagram illustrating a process of mapping an LTE QoS class to a differentiated services core point (DSCP) QoS class according to an implementation described herein. In one implementation, the process of FIG. 10 may be performed by BHR 330. In other implementations, some or all of the process of FIG. 10 may be performed by another device or a group of devices separate from and/or possibly remote from BHR 330 and/or including BHR 330.

The process of FIG. 10 may include receiving a packet from an LTE network (block 1010). For example, router module 510 may receive a packet from LTE network 130 via LTE module 320 and USB cable 325. An LTE QoS class may be determined for the packet (block 1020). For example, QoS manager 530 may determine an LTE QCI associated with the packet.

When sending traffic of a particular QoS in LTE network 130, an MME (not shown in FIG. 1), may send a bearer setup request to eNodeB 140. eNodeB 140 may map an Evolved Packet System (EPS) bearer, associated with QoS management in LTE network 130, to a radio bearer QoS, and may send a Radio Resource Control (RRC) Reconfiguration message to BHR 330 with a request to create a new radio bearer with a particular QoS. The RRC Reconfiguration message may include a Traffic Flow Template (TFT) that includes a packet filter that maps traffic flows onto radio bearers. Thus, a radio bearer of a particular LTE QCI is set up between eNodeB 140 and BHR 330, and BHR 330 may use the received TFT to map particular packets to the created radio bearer (which is associated with the particular LTE QCI). Thus, in one implementation, when BHR 330 receives a packet, QoS manager 530 may identify an LTE QCI for the packet based on a packet filter included in the TFT associated with a particular radio bearer QoS. In another implementation, QoS manager 530 may identify an LTE QCI associated with a packet using another technique(s).

The LTE QoS class may be mapped to a DSCP QoS class (block 1030). For example, QoS manager 530 may access QoS mapping table 540 to determine a particular DSCP QoS class that corresponds to the determined LTE QoS class. A determination may be made whether a user subscribed to the mapped DSCP class (block 1040). For example, QoS manager 530 may access SIM 520 to determine whether the subscription includes a subscription for the particular DSCP QoS class. For example, the particular DSCP QoS class may correspond to voice, and the subscription may not include a VoIP service. As another example, the particular DSCP class may correspond to premium access Internet traffic, and the subscription may not include a premium access Internet traffic service.

If it is determined that the user did not subscribe to the mapped DSCP QoS class (block 1040—NO), a DSCP QoS class of a lower priority may be selected (block 1050). For example, QoS manager 530 may select a DSCP QoS class of a lower priority. In one implementation, if a subscription does not include a particular DSCP QoS class, QoS manager 530 may select a best effort traffic QoS class (e.g., DSCP QoS class 9). In another implementation, if a subscription does not include a particular DSCP QoS class and the packet is associated with real-time data, QoS manager 530 may select another DSCP QoS class, associated with real-time data, of lower priority. Processing may continue to block 1070 and the selected DSCP QoS class of the lower priority may be assigned to the packet.

If it is determined that the user did subscribe to the mapped DSCP QoS class (block 1040—YES), a determination may be made whether there is available bandwidth for the mapped DSCP QoS class (block 1060). For example, in one implementation, QoS manager 530 may check a particular DSCP class queue associated with the mapped DSCP QoS class to determine a load associated with the DSCP QoS class queue. If QoS manager 530 determines that the amount of data stored in the particular DSCP QoS class queue is greater than a threshold, QoS manager 530 may determine that there is no bandwidth available for the particular DSCP QoS class. In another implementation, QoS manager 530 may determine an available bandwidth using another technique(s).

If it is determined that there is no bandwidth available for the mapped DSCP QoS class (block 1060—NO), a DSCP QoS class of a lower priority may be selected (block 1050). For example, QoS manager 530 may select a QoS class of a lower priority. In one implementation, QoS manager 530 may select a best effort traffic QoS class (e.g., DSCP QoS class 9). In another implementation, if the particular DSCP QoS class is associated with real-time data, QoS manager 530 may select another DSCP QoS class, associated with real-time data, of lower priority. Processing may continue to block 1070 and the selected DSCP QoS class of the lower priority may be assigned to the packet.

If it is determined that there is bandwidth available for the mapped DSCP QoS class (block 1060—YES), the DSCP QoS class may be assigned to the packet (block 1070). For example, QoS manager 530 may assign the mapped DSCP QoS class to the packet.

The packet may be forward to a customer premises queue associated with the assigned DSCP QoS class (block 1080). For example, router module 510 may forward the packet to the DSCP QoS class queue 550 associated with the assigned DSCP QoS class.

While the process of FIG. 10 has been described as being performed for a particular packet, in another implementation, the process of FIG. 10 may be performed for a particular traffic flow. Thus, a packet may be identified as belonging to a particular traffic flow (e.g., based on packet filters stored in a TFT associated with a radio bearer QoS) and mapped to a particular DSCP QoS class associated with the particular traffic flow.

Figure 11:
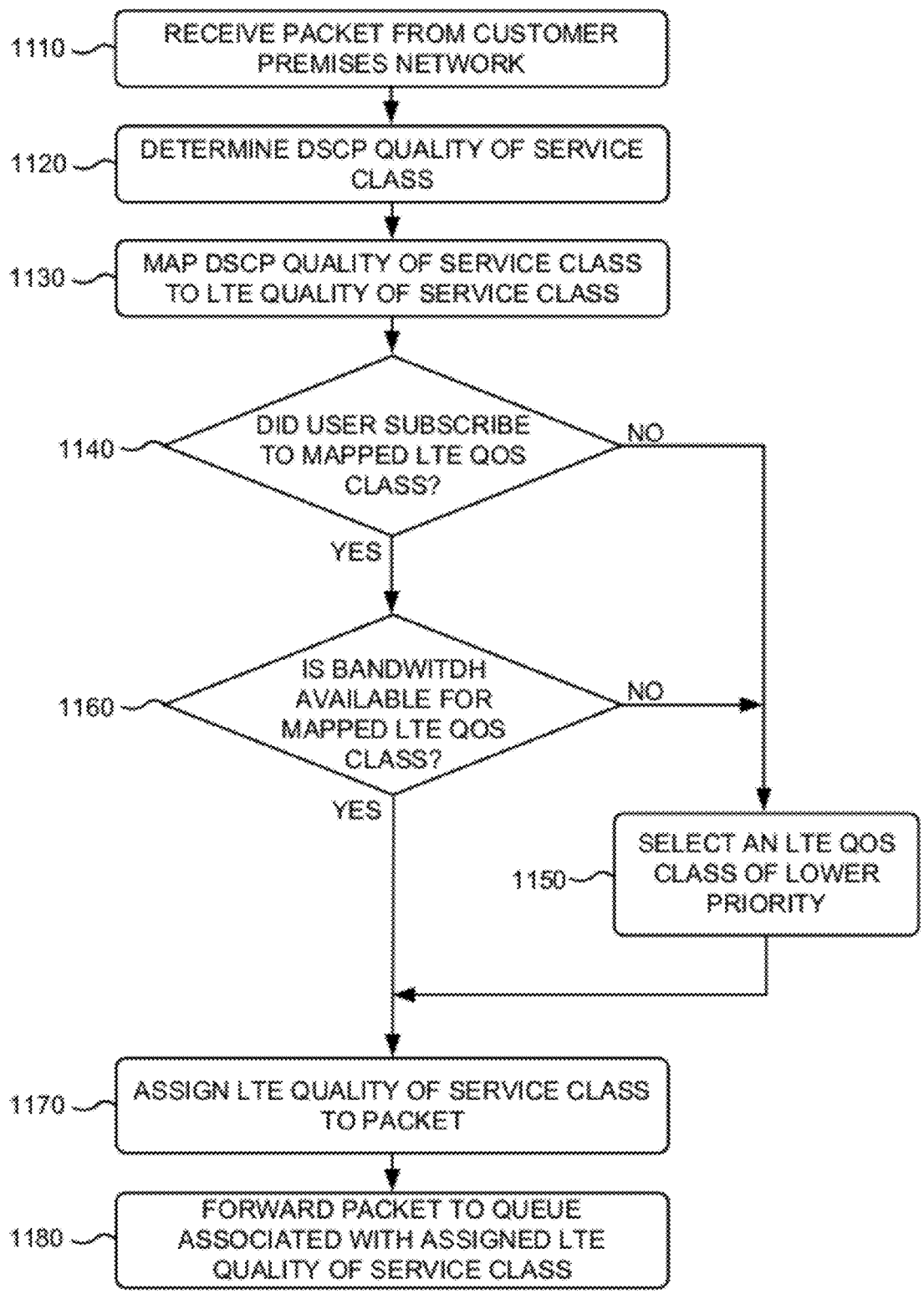
FIG. 11 is a flow diagram illustrating a process of mapping a DSCP QoS class to an LTE QoS class according to an implementation described herein.

FIG. 11 is a flow diagram illustrating a process of mapping a DSCP QoS class to an LTE QoS class according to an implementation described herein. In one implementation, the process of FIG. 11 may be performed by BHR 330. In other implementations, some or all of the process of FIG. 11 may be performed by another device or a group of devices separate from and/or possibly remote from BHR 330 and/or including BHR 330.

The process of FIG. 11 may include receiving a packet from a customer premises network (block 1110). For example, router module 510 may receive a packet from a particular device in customer premises network 110 via coaxial cable 204. A DSCP QoS class may be determined for the packet (block 1120). For example, in one implementation, QoS manager 530 may determine a DSCP QoS associated with an IP packet received from a particular device in customer premises network 110 by accessing a differentiated services field of a header of the IP packet. In another implementation, QoS manager 530 may determine the DSCP QoS class associated with an IP packet received from a particular device in customer premises network 110 using another technique(s).

The DSCP QoS class may be mapped to an LTE QoS class (block 1130). For example, QoS manager 530 may access QoS mapping table 540 to determine a particular LTE QCI that corresponds to the determined DSCP QoS class. A determination may be made whether a user subscribed to the mapped LTE QoS class (block 1140). For example, QoS manager 530 may access SIM 520 to determine whether the subscription includes a subscription for the particular LTE QCI. For example, the particular LTE QCI may correspond to voice, and the subscription may not include a VoIP service. As another example, the particular LTE QCI may correspond to premium access Internet traffic, and the subscription may not include a premium access Internet traffic service.

If it is determined that the user did not subscribe to the mapped LTE QoS class (block 1140—NO), an LTE QoS class of a lower priority may be selected (block 1150). For example, QoS manager 530 may select an LTE QCI of a lower priority. In one implementation, if a subscription does not include a particular LTE QCI, QoS manager 530 may select a best effort traffic LTE QCI (e.g., LTE QCI 9). In another implementation, if a subscription does not include a particular LTE QCI and the packet is associated with real-time data, QoS manager 530 may select another LTE QCI, associated with real-time data, of lower priority. Processing may continue to block 1070 and the selected LTE QCI of the lower priority may be assigned to the packet.

If it is determined that the user did subscribe to the mapped LTE QoS class (block 1140—YES), a determination may be made whether there is available bandwidth for the mapped LTE QoS class (block 1060). For example, in one implementation, QoS manager 530 may check a particular LTE QoS class queue associated with the mapped LTE QCI to determine a load associated with the LTE QoS class queue. If QoS manager 530 determines that the amount of data stored in the particular LTE QoS class queue is greater than a threshold, QoS manager 530 may determine that there is no bandwidth available for the particular LTE QoS class. In another implementation, QoS manager 530 determine an available bandwidth using another technique(s).

If it is determined that there is no bandwidth available for the mapped LTE QoS class (block 1160—NO), an LTE QoS class of a lower priority may be selected (block 1150). For example, QoS manager 530 may select an LTE QoS class of a lower priority. In one implementation, QoS manager 530 may select a best effort traffic LTE QCI (e.g., LTE QCI 9). In another implementation, if the particular LTE QCI is associated with real-time data, QoS manager 530 may select another LTE QCI, associated with real-time data, of lower priority. Processing may continue to block 1070 and the selected LTE QCI of the lower priority may be assigned to the packet.

If it is determined that there is bandwidth available for the mapped LTE QoS class (block 1160—YES), the LTE QoS class may be assigned to the packet (block 1170). For example, QoS manager 530 may assign the mapped LTE QCI to the packet.

The packet may be forwarded to a customer premises queue associated with the assigned LTE QoS class (block 1180). For example, router module 510 may forward the packet to the LTE QoS class queue 560 associated with the assigned LTE QCI.

While the process of FIG. 11 has been described as being performed for a particular packet, in another implementation, the process of FIG. 11 may be performed for a particular traffic flow. Thus, a packet may be identified as belonging to a particular traffic flow (e.g., based on packet filters stored in a TFT associated with a radio bearer QoS) and mapped to a particular radio bearer QoS associated with the assigned LTE QCI.

Figure 12:
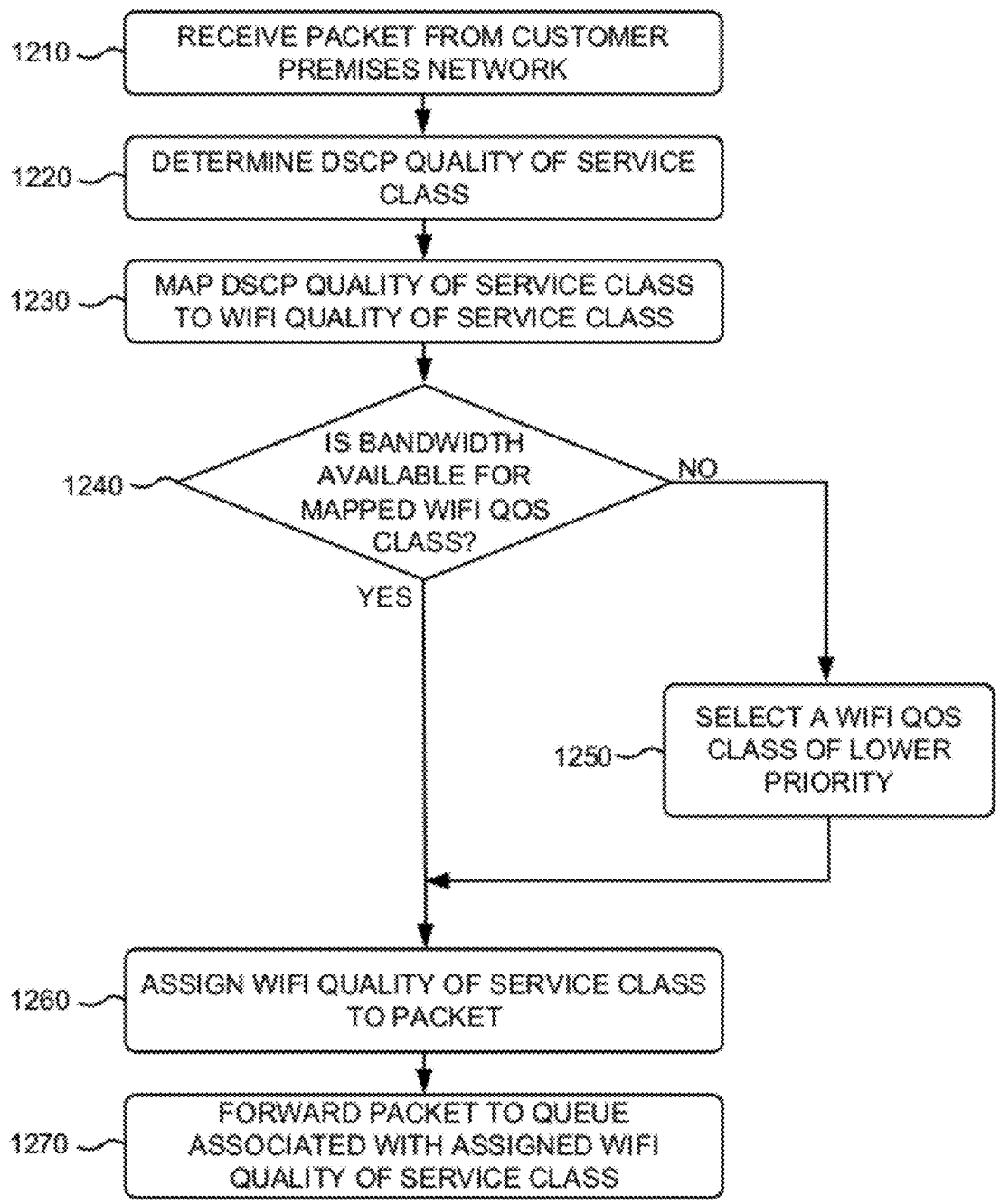
FIG. 12 is a flow diagram illustrating a process of mapping a DSCP QoS class to a WiFi QoS class according to an implementation described herein.

FIG. 12 is a flow diagram illustrating a process of mapping a DSCP QoS class to a WiFi QoS class according to an implementation described herein. In one implementation, the process of FIG. 12 may be performed by WiFi access point 260. In other implementations, some or all of the process of FIG. 12 may be performed by another device or a group of devices separate from and/or possibly remote from WiFi access point 260 and/or including WiFi access point 260.

The process of FIG. 12 may include receiving a packet from a customer premises network (block 1210). For example, WiFi router 710 may receive a packet from BHR 330 (or another device in customer premises network 110) via Cat 5 cable 255. A DSCP QoS class may be determined for the packet (block 1220). For example, QoS manager 730 may determine a DSCP QoS class associated with the packet.

For example, in one implementation, QoS manager 730 may determine a DSCP QoS class associated with an IP packet received from BHR 330 (or another device in customer premises network 110) by accessing a differentiated services field of a header of the IP packet. In another implementation, QoS manager 730 may determine the DSCP QoS class associated with an IP packet received from BHR 330 (or another device in customer premises network 110) using another technique(s).

The DSCP QoS class may be mapped to a WiFi QoS class (block 1230). For example, QoS manager 730 may access QoS mapping table 740 to determine a particular WiFi QoS class that corresponds to the determined DSCP QoS class. A determination may be made whether there is available bandwidth for the mapped WiFi QoS class (block 1240). For example, in one implementation, QoS manager 730 may check a particular WiFi class queue associated with the mapped WiFi QoS class to determine a load associated with the WiFi QoS class queue. If QoS manager 730 determines that the amount of data stored in the particular WiFi QoS class queue is greater than a threshold, QoS manager 730 may determine that there is no bandwidth available for the particular WiFi QoS class. In another implementation, QoS manager 730 may determine an available bandwidth using another technique(s).

If it is determined that there is no bandwidth available for the mapped WiFi QoS class (block 1240—NO), a WiFi QoS class of a lower priority may be selected (block 1250). For example, QoS manager 730 may select a WiFi QoS class of a lower priority. In one implementation, QoS manager 730 may select a best effort traffic WiFi QoS class (e.g., WiFi QoS class 9). In another implementation, if the particular WiFi QoS class is associated with real-time data, QoS manager 730 may select another WiFi QoS class, associated with real-time data, of lower priority. Processing may continue to block 1260 and the selected WiFi QoS class of the lower priority may be assigned to the packet.

If it is determined that there is bandwidth available for the mapped WiFi QoS class (block 1240—YES), the WiFi QoS class may be assigned to the packet (block 1260). For example, QoS manager 730 may assign the mapped WiFi QoS class to the packet.

The packet may be forwarded to a queue associated with the assigned WiFi QoS class (block 1270). For example, WiFi router 710 may forward the packet to the WiFi QoS class queue 750 associated with the assigned WiFi QoS class.

While the process of FIG. 12 has been described as being performed for a particular packet, in another implementation, the process of FIG. 12 may be performed for a particular traffic flow. Thus, a packet may be identified as belonging to a particular traffic flow and mapped to a particular WiFi QoS class associated with the particular traffic flow.

Figure 13:
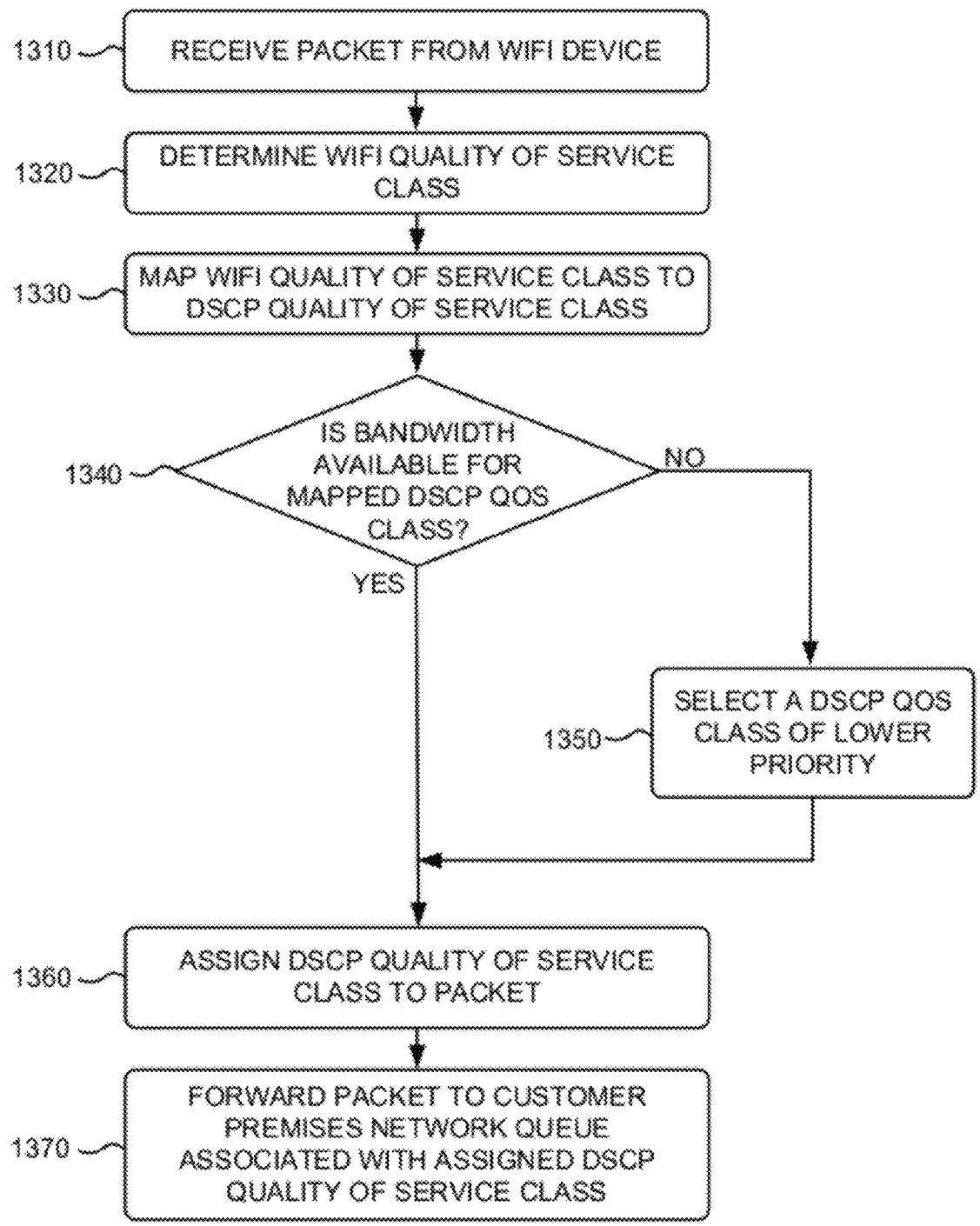
FIG. 13 is a flow diagram illustrating a process of mapping a WiFi QoS class to a DSCP QoS class according to an implementation described herein.

FIG. 13 is a flow diagram illustrating a process of mapping a WiFi QoS class to a DSCP QoS class according to an implementation described herein. In one implementation, the process of FIG. 13 may be performed by WiFi access point 260. In other implementations, some or all of the process of FIG. 13 may be performed by another device or a group of devices separate from and/or possibly remote from WiFi access point 260 and/or including WiFi access point 260.

The process of FIG. 13 may include receiving a packet from a WiFi device (block 1210). For example, WiFi router 710 may receive a packet from a device communicating with WiFi access point 260 (e.g., user device 270-3). A WiFi QoS class may be determined for the packet (block 1320). For example, QoS manager 730 may determine a WiFi QoS class associated with the packet based on a particular traffic specification parameter included in a header of the packet. When customer device 270-3 initiates a communication with WiFi access point 260, customer device 270-3 may make a reservation request for a traffic flow of a particular QoS class based on the traffic specification parameter. QoS manager 730 may associate packets, associated with the traffic flow, to a particular WiFi class based on the particular traffic specification parameter included in a packet sent by customer device 270-3.

The WiFi QoS class may be mapped to a DSCP QoS class (block 1330). For example, QoS manager 730 may access QoS mapping table 740 to determine a particular DSCP QoS class that corresponds to the determined WiFi QoS class. A determination may be made whether there is available bandwidth for the mapped DSCP QoS class (block 1340). For example, in one implementation, QoS manager 730 may check a particular DSCP class queue 760 associated with the mapped DSCP QoS class to determine a load associated with the DSCP QoS class queue. If QoS manager 730 determines that the data stored in the particular DSCP QoS class queue is greater than a threshold, QoS manager 730 may determine that there is no bandwidth available for the particular DSCP QoS class. In another implementation, QoS manager 730 determine an available bandwidth using another technique(s).

If it is determined that there is no bandwidth available for the mapped DSCP QoS class (block 1340—NO), a DSCP QoS class of a lower priority may be selected (block 1350). For example, QoS manager 730 may select a DSCP QoS class of a lower priority. In one implementation, QoS manager 730 may select a best effort traffic DSCP QoS class (e.g., DSCP QoS class 9). In another implementation, if the particular DSCP QoS class is associated with real-time data, QoS manager 730 may select another DSCP QoS class, associated with real-time data, of lower priority. Processing may continue to block 1360 and the selected DSCP QoS class of the lower priority may be assigned to the packet.

If it is determined that there is bandwidth available for the mapped DSCP QoS class (block 1340—YES), the DSCP QoS class may be assigned to the packet (block 1360). For example, QoS manager 730 may assign the mapped DSCP QoS class to the packet.

The packet may be forwarded to a queue associated with the assigned DSCP QoS class (block 1370). For example, WiFi router 710 may forward the packet to the DSCP QoS class queue 760 associated with the assigned DSCP QoS class.

While the process of FIG. 13 has been described as being performed for a particular packet, in another implementation, the process of FIG. 13 may be performed for a particular traffic flow. Thus, a packet may be identified as belonging to a particular traffic flow and mapped to a particular DSCP QoS class associated with the particular traffic flow.

The foregoing description of implementations, described above, provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-13, the order of the blocks may be modified in other implementations. Further, non-dependent blocks may be performed in parallel.

As another example, while particular implementations have been described as mapping LTE QCI to DSCP QoS classes, in another implementation, customer premises network 110 may use another QoS class marking, and BHR 330 may map LTE QCIs to the other QoS classes used by customer premises network 110. Similarly, WiFi access point 260 may map the other QoS classes used by customer premises network 110 to WiFi QoS classes.

Also, certain portions of the implementations may have been described as a "component" or "module" that performs one or more functions. The terms "component" and "module" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a fixed wireless router device, the method comprising:
    receiving, by the fixed wireless router device, a packet from a Long Term Evolution network via a wireless connection from a base station, wherein the packet is associated with a particular Long Term Evolution Quality of Service class;
    mapping, by the fixed wireless router device, the particular Long Term Evolution Quality of Service class to a particular Differentiated Services Code Point Quality of Service class;
    determining, by the fixed wireless router device, whether a subscription associated with the fixed wireless router device includes a service associated with the particular Differentiated Services Code Point Quality of Service class;
    assigning, by the fixed wireless router device, the particular Differentiated Services Code Point Quality of Service class to the packet, when the subscription includes the service associated with the particular Differentiated Services Code Point Quality of Service class;
    assigning, by the fixed wireless router device, another Differentiated Services Code Point Quality of Service class, associated with a lower priority than a priority associated with the particular Differentiated Services Code Point Quality of Service class, to the packet, when the subscription does not include the service associated with the particular Differentiated Services Code Point Quality of Service class; and
    forwarding, by the fixed wireless router device, the packet over a wired connection to a particular device in a customer premises network serviced by the fixed wireless router device, based on a priority associated with the assigned Differentiated Services Code Point Quality of Service class.

2. The method of claim 1, wherein the assigned Differentiated Services Code Point Quality of Service class corresponds to the particular Differentiated Services Code Point Quality of Service class.

3. The method of claim 1, wherein the other Differentiated Services Code Point Quality of Service class, associated with the lower priority than the particular Differentiated Services Code Point Quality of Service class, corresponds to a best effort Internet traffic Quality of Service class.

4. The method of claim 1, further comprising, when the subscription includes the service associated with the particular Differentiated Services Code Point Quality of Service class:
    determining whether there is available bandwidth for the particular Differentiated Services Code Point Quality of Service class in the customer premises network;
    assigning the particular Differentiated Services Code Point Quality of Service class to the packet, in response to determining that there is available bandwidth for the particular Differentiated Services Code Point Quality of Service class in the customer premises network; and
    assigning a lower priority Differentiated Services Code Point Quality of Service class to the packet, in response to determining that there is insufficient available bandwidth for the particular Differentiated Services Code Point Quality of Service class in the customer premises network.

5. The method of claim 1, wherein mapping the particular Long Term Evolution Quality of Service class to a particular Differentiated Services Code Point Quality of Service class comprises one of:
    mapping a Long Term Evolution Quality of Service class, associated with voice communication, to a Differentiated Services Code Point Quality of Service class, associated with voice communication;
    mapping a Long Term Evolution Quality of Service class, associated with video telephony, to a Differentiated Services Code Point Quality of Service class, associated with video telephony;
    mapping a Long Term Evolution Quality of Service class, associated with video streaming, to a Differentiated Services Code Point Quality of Service class, associated with video streaming;
    mapping a Long Term Evolution Quality of Service class, associated with real-time gaming, to a Differentiated Services Code Point Quality of Service class, associated with real-time gaming;
    mapping a Long Term Evolution Quality of Service class, associated with application signaling, to a Differentiated Services Code Point Quality of Service class, associated with application signaling;
    mapping a Long Term Evolution Quality of Service class, associated with a third party hosted application, to a Differentiated Services Code Point Quality of Service class, associated with a third party hosted application;
    mapping a Long Term Evolution Quality of Service class, associated with premium access Internet traffic, to a Differentiated Services Code Point Quality of Service class, associated with premium access Internet traffic; or
    mapping a Long Term Evolution Quality of Service class, associated with best effort Internet traffic, to a Differentiated Services Code Point Quality of Service class, associated with best effort Internet traffic.

6. The method of claim 1, further comprising:
    receiving a packet from the particular device, wherein the packet is associated with a particular Differentiated Services Code Point Quality of Service;
    mapping the particular Differentiated Services Code Point Quality of Service to a particular Long Term Evolution Quality of Service class;
    assigning a Long Term Evolution Quality of Service class to the packet based on the particular Long Term Evolution Quality of Service class; and
    forwarding the packet to a eNodeB associated with the Long Term Evolution network, based on a priority associated with the assigned Long Term Evolution Quality of Service class.

7. The method of claim 6, where the assigned Long Term Evolution Quality of Service class corresponds to the particular Long Term Evolution Quality of Service class.

8. The method of claim 6, where assigning a Long Term Evolution Quality of Service class to the packet includes:

determining whether a subscription associated with the fixed wireless router device includes a service associated with the particular Long Term Evolution Quality of Service class;

assigning the particular Long Term Evolution Quality of Service class to the packet when the subscription includes the service associated with the particular Long Term Evolution Quality of Service class; and assigning another Long Term Evolution Quality of Service class, associated with a lower priority than a priority associated with the particular Long Term Evolution Quality of Service class, to the packet when the subscription does not include the service associated with the particular Long Term Evolution Quality of Service class.

9. A fixed wireless router device comprising:

a memory to store instructions; and a processor configured to execute the instructions to implement:

a router module to:

receive a first packet from a Long Term Evolution network via a wireless connection from a base station, forward the first packet over a wired connection to a particular device in a customer premises network serviced by the fixed wireless router device, based on a priority associated with a first or second Differentiated Services Code Point Quality of Service class assigned to the first packet, receive a second packet over the wired connection from the particular device in the customer premises network, and forward the second packet to the Long Term Evolution network via the wireless connection to the base station, based on a priority associated with a second Long Term Evolution Quality of Service class assigned to the second packet; and a Quality of Service manager to:

determine a first Long Term Evolution Quality of Service class associated with the first packet, map the first Long Term Evolution Quality of Service class to a first Differentiated Services Code Point Quality of Service class, determine whether a subscription associated with the fixed wireless router device includes a service associated with the first Differentiated Services Code Point Quality of Service class, assign the first Differentiated Services Code Point Quality of Service class to the packet, when the subscription includes the service associated with the first Differentiated Services Code Point Quality of Service class, assign the second Differentiated Services Code Point Quality of Service class, associated with a lower priority than a priority associated with the first Differentiated Services Code Point Quality of Service class, to the packet, when the subscription does not include the service associated with the first Differentiated Services Code Point Quality of Service class, determine a third Differentiated Services Code Point Quality of Service class associated with the second packet, and assign the second Long Term Evolution Quality of Service class to the second packet based on the determined third Differentiated Services Code Point Quality of Service class.

10. The fixed wireless router device of claim 9, further comprising:

a Quality of Service mapping table that maps one or more of:

a Long Term Evolution Quality of Service class, associated with voice communication, to a Differentiated Services Code Point Quality of Service class, associated with voice communication;

a Long Term Evolution Quality of Service class, associated with video telephony, to a Differentiated Services Code Point Quality of Service class, associated with video telephony;

a Long Term Evolution Quality of Service class, associated with video streaming, to a Differentiated Services Code Point Quality of Service class, associated with video streaming;

a Long Term Evolution Quality of Service class, associated with real-time gaming, to a Differentiated Services Code Point Quality of Service class, associated with real-time gaming;

a Long Term Evolution Quality of Service class, associated with application signaling, to a Differentiated Services Code Point Quality of Service class, associated with application signaling;

a Long Term Evolution Quality of Service class, associated with a third party hosted application, to a Differentiated Services Code Point Quality of Service class, associated with a third party hosted application;

a Long Term Evolution Quality of Service class, associated with premium access Internet traffic, to a Differentiated Services Code Point Quality of Service class, associated with premium access Internet traffic; or a Long Term Evolution Quality of Service class, associated with best effort Internet traffic, to a Differentiated Services Code Point Quality of Service class, associated with best effort Internet traffic; and wherein the Quality of Service manager is to access the Quality of Service mapping table when assigning the first or second Differentiated Services Code Point Quality of Service class to the packet, or when assigning the second Long Term Evolution Quality of Service class to the second packet.

11. The fixed wireless router device of claim 9, where the fixed wireless router device includes a device that conforms to standards of the Multimedia over Coax Alliance.

12. The fixed wireless router device of claim 9, where the particular device in the customer premises network includes:

a personal computer, a set-top box, a television, a local router, a WiFi access point, or a Voice over Internet Protocol telephone.

13. The fixed wireless router device of claim 9, where the router module is further to:

receive a third packet from a first device in the customer premises network;

identify a second device in the customer premises network as a destination of the third packet; and forward the third packet to the second device.

14. The fixed wireless router device of claim 9, further comprising:

a Subscriber Identity Module to store:

information identifying a particular subscription associated with the Long Term Evolution network;

a total data limit associated with the particular subscription; or information about a particular service included with the particular subscription, wherein the particular service is associated with a particular Long Term Evolution Quality of Service class or a particular Differentiated Services Code Point Quality of Service class; and wherein the Quality of Service manager is to access the Subscriber Identity Module when assigning the first or second Differentiated Services Code Point Quality of Service class to the first packet, or when assigning the second Long Term Evolution Quality of Service class to the second packet.

15. A non-transitory computer-readable medium storing instructions executable by one or more processors, the non-transitory computer-readable medium comprising:
one or more instructions to receive a packet from a Long Term Evolution network by a fixed wireless router device via a wireless connection from a base station, wherein the packet is associated with a particular Long Term Evolution Quality of Service class;
one or more instructions to map the particular Long Term Evolution Quality of Service class to a particular Differentiated Services Code Point Quality of Service class;
one or more instructions to determine whether a subscription associated with the fixed wireless router device includes a service associated with the particular Differentiated Services Code Point Quality of Service class;
one or more instructions to assign the particular Differentiated Services Code Point Quality of Service class to the packet, in response to determining that the subscription includes the service associated with the particular Differentiated Services Code Point Quality of Service class;
one or more instructions to assign a lower priority Differentiated Services Code Point Quality of Service class to the packet, in response to determining that the subscription does not include the service associated with the particular Differentiated Services Code Point Quality of Service class; and
one or more instructions to forward the packet over a wired connection to a particular device in a customer premises network serviced by the fixed wireless router device, based on a priority associated with the assigned Differentiated Services Code Point Quality of Service class.

* * * * *